(12) United States Patent
Proctor et al.

(10) Patent No.: US 10,247,822 B2
(45) Date of Patent: Apr. 2, 2019

(54) SONAR TRANSDUCER ASSEMBLY

(71) Applicant: NAVICO HOLDING AS, Egersund (NO)

(72) Inventors: Alan Lee Proctor, Owasso, OK (US); David Austin Parks, Tulsa, OK (US); Ronald Joe Horner, Collinsville, OK (US)

(73) Assignee: NAVICO HOLDING AS, Egersund (NO)

( * ) Notice: Subject to any disclaimer, the term of this patent is extended or adjusted under 35 U.S.C. 154(b) by 504 days.

(21) Appl. No.: 14/689,764

(22) Filed: Apr. 17, 2015

(65) Prior Publication Data
US 2016/0377716 A1 Dec. 29, 2016

Related U.S. Application Data

(63) Continuation-in-part of application No. 13/827,329, filed on Mar. 14, 2013, now Pat. No. 9,335,412.
(Continued)

(51) Int. Cl.
*G01S 15/00* (2006.01)
*G01S 15/89* (2006.01)
(Continued)

(52) U.S. Cl.
CPC ........ *G01S 15/8902* (2013.01); *G01S 7/6245* (2013.01); *G01S 15/89* (2013.01); *G01S 15/96* (2013.01); *Y10T 29/49002* (2015.01)

(58) Field of Classification Search
CPC ...................................................... G01S 15/89
See application file for complete search history.

(56) References Cited

U.S. PATENT DOCUMENTS 4,939,700 A 7/1990 Breton
5,077,699 A 12/1991 Passamante et al.
(Continued)

FOREIGN PATENT DOCUMENTS

GB 2294763 A * 5/1996 ............. G01S 15/88
JP 01-118791 A 5/1989
(Continued)

OTHER PUBLICATIONS

Office Action for Japanese Application No. 2014-051465 dated Jul. 27, 2015.
(Continued)

*Primary Examiner* — Hovhannes Baghdasaryan
(74) *Attorney, Agent, or Firm* — Nelson Mullins Riley & Scarborough LLP

(57) ABSTRACT

Sonar systems and associated methods are provided herein for sonar image generation. The sonar system is configured to enable rotation of a transducer array that includes at least two transducer elements. The transducer array may be mounted to a trolling motor capable of being rotated. The transducer elements can be positioned to enable use of interferometry to obtain angle information regarding sonar returns. The angle and range of each sonar return can be used to form images, such as a 2D forward looking image of the underwater environment. A heading detector can be used to obtain a heading of the transducer elements to enable creation of a 2D radar-like image of the underwater environment. Additionally, the heading, angle, and range of the sonar returns can be used to form a 3D image of the underwater environment.

30 Claims, 15 Drawing Sheets

Related U.S. Application Data

(60) Provisional application No. 62/024,416, filed on Jul. 14, 2014, provisional application No. 62/128,641, filed on Mar. 5, 2015.

(51) Int. Cl.
    *G01S 7/62* (2006.01)
    *G01S 15/96* (2006.01)

(56) References Cited

U.S. PATENT DOCUMENTS

| | | | |
|---|---|---|---|
| 5,184,330 A | 2/1993 | Adams | |
| 5,200,931 A | 4/1993 | Kosalos et al. | |
| 5,530,680 A | 6/1996 | Whitehurst | |
| 5,537,380 A | 7/1996 | Sprankle et al. | |
| 5,568,152 A | 10/1996 | Janky et al. | |
| 5,675,552 A | 10/1997 | Hicks et al. | |
| 5,805,528 A | 9/1998 | Hamada et al. | |
| 5,923,617 A | 7/1999 | Thompson et al. | |
| 7,113,449 B2 | 9/2006 | Fairbairn | |
| 7,369,459 B2 | 5/2008 | Kawabata et al. | |
| 7,542,376 B1 | 6/2009 | Thompson et al. | |
| 7,606,114 B2 | 10/2009 | Bachelor et al. | |
| 7,652,952 B2 | 1/2010 | Betts et al. | |
| 7,729,203 B2 | 6/2010 | Betts et al. | |
| 7,755,974 B2 | 7/2010 | Betts et al. | |
| 7,889,600 B2 | 2/2011 | Thompson et al. | |
| 8,295,393 B2 | 10/2012 | Watanabe et al. | |
| 8,300,499 B2 | 10/2012 | Coleman et al. | |
| 8,305,840 B2 | 11/2012 | Maguire | |
| 8,305,844 B2 | 11/2012 | DePasqua | |
| 8,486,968 B2 | 7/2013 | Priepke et al. | |
| 8,514,658 B2 | 8/2013 | Maguire | |
| 8,605,550 B2 | 12/2013 | Maguire | |
| 8,711,140 B1 | 4/2014 | Mallet | |
| 8,717,847 B2 | 5/2014 | Blake | |
| 8,767,509 B2 | 7/2014 | Freking et al. | |
| 8,879,359 B2 | 11/2014 | DePasqua | |
| 8,953,647 B1 | 2/2015 | Mead et al. | |
| 9,405,028 B2 | 8/2016 | Bloor | |
| 9,495,764 B1 | 11/2016 | Boardman et al. | |
| 9,664,783 B2 | 5/2017 | Brown et al. | |
| 9,766,328 B2 | 9/2017 | Black et al. | |
| 9,784,825 B2 | 10/2017 | Brown et al. | |
| 9,784,826 B2 | 10/2017 | Matson et al. | |
| 9,812,118 B2 | 11/2017 | Matson et al. | |
| 2002/0071345 A1 | 6/2002 | Chiang et al. | |
| 2002/0126576 A1 | 9/2002 | Douma et al. | |
| 2002/0188200 A1 | 12/2002 | Mauchamp et al. | |
| 2003/0081503 A1 | 5/2003 | Barnard et al. | |
| 2003/0235112 A1 | 12/2003 | Zimmerman et al. | |
| 2005/0007880 A1 | 1/2005 | Zimmerman et al. | |
| 2005/0036404 A1 | 2/2005 | Zhu et al. | |
| 2005/0093859 A1 | 5/2005 | Sumanaweera et al. | |
| 2005/0099892 A1 | 5/2005 | Greelish | |
| 2005/0101867 A1 | 5/2005 | Johnson et al. | |
| 2005/0270901 A1 | 12/2005 | Swanson | |
| 2006/0186889 A1 | 8/2006 | Andreis | |
| 2007/0025183 A1 | 2/2007 | Zimmerman et al. | |
| 2007/0159922 A1 | 7/2007 | Zimmerman et al. | |
| 2007/0223306 A1 | 9/2007 | Toennessen | |
| 2007/0223307 A1 | 9/2007 | Storteig | |
| 2007/0291589 A1 | 12/2007 | Kawabata et al. | |
| 2008/0080308 A1 | 4/2008 | Hornby | |
| 2008/0239870 A1 | 10/2008 | Dubuis et al. | |
| 2009/0052277 A1 | 2/2009 | Swanson | |
| 2009/0073804 A1 | 3/2009 | Laws et al. | |
| 2009/0103595 A1 | 4/2009 | Watanabe et al. | |
| 2009/0147623 A1 | 6/2009 | Betts et al. | |
| 2010/0014386 A1 | 1/2010 | Thompson et al. | |
| 2010/0103775 A1 | 4/2010 | Betts et al. | |
| 2011/0013484 A1 | 1/2011 | Coleman et al. | |
| 2011/0013485 A1 | 1/2011 | Maguire | |
| 2011/0038227 A1 | 2/2011 | Kostov | |
| 2011/0128162 A1 | 6/2011 | Klepsvik | |
| 2012/0014220 A1 | 1/2012 | DePasqua | |
| 2012/0099395 A1 | 4/2012 | Debrunner et al. | |
| 2012/0106299 A1 | 5/2012 | Rowe et al. | |
| 2012/0195471 A1 | 8/2012 | Newcombe et al. | |
| 2013/0044569 A1 | 2/2013 | DePasqua | |
| 2013/0148471 A1 | 6/2013 | Brown et al. | |
| 2013/0173163 A1 | 7/2013 | Zhandov et al. | |
| 2013/0208568 A1 | 8/2013 | Coleman | |
| 2013/0215719 A1* | 8/2013 | Betts | G01S 7/521 367/88 |
| 2013/0242700 A1 | 9/2013 | Blake | |
| 2014/0010048 A1 | 1/2014 | Proctor | |
| 2014/0200815 A1 | 7/2014 | Hung et al. | |
| 2015/0003689 A1 | 1/2015 | Sheiman et al. | |
| 2015/0066450 A1 | 3/2015 | Charlesworth et al. | |
| 2015/0078123 A1 | 3/2015 | Batcheller | |
| 2015/0097838 A1 | 4/2015 | Steward et al. | |
| 2015/0130797 A1 | 5/2015 | Chen et al. | |
| 2015/0325043 A1 | 11/2015 | Bromley et al. | |
| 2015/0355373 A1 | 12/2015 | Zhuo et al. | |
| 2016/0003008 A1 | 1/2016 | Uribe et al. | |
| 2016/0104359 A1 | 4/2016 | AlMahmoud | |
| 2016/0123499 A1 | 5/2016 | Lewis | |
| 2016/0232884 A1 | 8/2016 | Parks | |
| 2017/0123062 A1 | 5/2017 | Coleman et al. | |
| 2017/0212230 A1 | 7/2017 | Wigh et al. | |

FOREIGN PATENT DOCUMENTS

| | | |
|---|---|---|
| JP | 01-216288 A | 8/1989 |
| JP | 11-153667 A | 6/1999 |
| JP | 2008-508539 A | 3/2008 |
| JP | 2009-068881 A | 4/2009 |
| WO | WO 2003/001231 A2 | 1/2003 |
| WO | WO 2006/017511 A2 | 2/2006 |
| WO | WO 2011/008430 A1 | 1/2011 |

OTHER PUBLICATIONS

Office Action for Japanese Application No. 2014-051465 dated Mar. 2, 2016.
*Simrad Introduces Forwardscan* [online] [Retrieved Nov. 25, 2014]. Retrieved from the Internet: <URL: http://www.simrad-yachting.com/en-US/Pressreleases/2014/Simrad-Introduces-Forwardscan/>. 2 pages.
*ForwardScan® Transducer* [online] [Retrieved Mar. 25, 2015]. Retrieved from the Internet: <URL: http://www.simrad-yachting.com/en-GB/Products/Echosounders/Transducers/ForwardScan-Transducer-en-gb.aspx>. 3 pages.
"Furuno CH-28 360° Scanning Sonar", 8 pages.
Furuno, *Operator's Manual, Color Searchlight Sonar; Model CH-28*; Furuno Electric Co., Ltd.; Nishinomiya, Japan; First Edition Jan. 1991; 44 pages.
Humminbird, "*Trolling Motor Mounted Transducer*", © 2013 Johnson Outdoors Marine Electronics, Inc.; pp. 1-4.
*Full-Circle Scanning Sonar FSV-30*, [online] [retrieved Apr. 18, 2013] Retrieved from the Internet: <URL: http://www.furuno.com/en/businessproduct/detail/marine/index.php?prdcd=FSV-30&category=sonar&business=fishing>.
*ITC Application Equations for Underwater Sound Transducers*, Published by International Transducer Corporation, Rev. 8/00 (1995) 3 pages.
*NOAA; Office of Coast Survey; Phase Differencing Bathymetric Sonar* [online] [Retrieved May 5, 2015]. Retrieved from the Internet: <URL: http://www.nauticalcharts.noaa.gov/csdl/PDBS.html>. 2 pages.
*Swath Bathymetry System* [online] [Retrieved May 5, 2015]. Retrieved from the Internet: URL:http://woodshole.er.usgs.gov/operations/sfmapping/swath.htm. 2 pages.
*Solving the Interferometric Processing Bottleneck* [online] [Retrieved May 5, 2015]. Retrieved from the Internet: <URL: http://www.oicinc.com/Hiller_Solving-Interferometric-Bottleneck.pdf>. 3 pages.
Office Action from Japanese Patent Application 2015 No. 2014-051465 dated Feb. 23, 2015.

(56) References Cited

OTHER PUBLICATIONS

International Search Report and Written Opinion from International Application No. PCT/US2014/023984, dated Sep. 1, 2014.
Second Written Opinion of the International Preliminary Examining Authority from International Application No. PCT/US2014/023984, dated Mar. 5, 2015.
U.S. Appl. No. 14/618,987, filed Feb. 10, 2015.
U.S. Appl. No. 14/798,148, filed Jul. 13, 2015, Entitled: "Depth Display Using Sonar Data".
Sinead Introduces Forwardscan [online] [retrieved Nov. 25, 2014]. Retrieved from the Internet: < URL: http://www.simrad-yachting.com/en-US/Pressreleases/2014/Simrad-.
ITC Application Equations for Underwater Sound Transducers, International Transducer Corporation (1995) Rev. 8/00, 3 pages.
*U.S. Appl. No. 62/128,641, filed Mar. 5, 2015; In re: Kirmani; entitled Methods and Apparatus for Reconstructing a 3D Sonar.*
*U.S. Appl. No. 62/024,416, filed Jul. 14, 2014; In re: Horner et al; entitled Forward Looking Sonar Display.*
*U.S. Appl. No. 62/050,123, filed Sep. 13, 2014; In re: Nicket et al.; entitled Marine Navigation Using Alert Zones.*
European Search Report for European Application No. EP 16158998 dated Jul. 20, 2016.
Giardina; Interferometric Synthetic Aperture Sonar Signal Processing for Autonomous Underwater Vehicles Operating Shallow Water; University of New Orleans Theses and Dissertations; Dec. 15, 2012; Retrieved from the Internet: URL:http://scholarworks.uno.edu/cgi/viewcontent.cgi?article=2587&context=td (retrieved on Jul. 7, 2016).
H.D. Griffiths, et al.; Interferometric Synthetic Aperture Sonar for High-Resolution 3-D Mapping of the Seabed; IEE Proceedings—Radar, Sonar and Navigation; vol. 144, No. 2; Apr. 1997; pp. 96-103.
Roy Edgar Hansen, et al.; Signal Processing for AUV Based Interferometric Synthetic Aperture Sonar; Oceans 2003, MTS/IEEE Proceedings.Celebrating the Past, Teaming Toward the Future; San Diego, CA; Sep. 22-26, 2003; Oceans MTS/IEEE Conference Proceedings, Columbia, MD; Marine Techn. Soc., Sep. 22, 2003; pp. 2438-2444.
Christophe Sintes, et al.; Interferometric Side Scan Sonar: A Tool for High Resolution Sea Floor Exploration; Technical Lessons Learnt from the Erika Incident and Other Oil Spills, Brest, Mar. 13-16, 2002; pp. 1-15.
H. Koyama et al., "Bathymetry by new designed interferometry sonar mounted on AUV", Oceans 2004, MTS/IEEE Techno-Ocean Mar. 14, 2005; pp. 1169-1174.
Gerard Llort-Pujol et al., "A New Approach for Fast and High-Resolution Interfometric Bathymetry", IEEE Oceanic Engineering Society Newsletter, Summer 2006, pp. 12-19.
DePasqua; Humminbird 360 Degree Sonar, <https://www.youtube.com/watch?v=VetZhhulQ0Y>, Feb. 26, 2012.
WiseGeek, http://www.wisegeek.com/what-is-3d-imaging.htm (2009).
Nikolov, et al.; Three-dimensional real-time synthetic aperture imaging using a rotating phased array transducer; In Proceedings of IEEE Ultrasonics Symposium, 2002, pp. 1545-1548; IEEE, DOI: 10.1109/ULTSYM.2002.1192596 (Year: 2002).

\* cited by examiner

SONAR TRANSDUCER ASSEMBLY

RELATED APPLICATIONS

This application claims priority to and is a continuation-in-part application of U.S. application Ser. No. 13/827,329, entitled "Sonar Transducer Assembly", filed on Mar. 14, 2013, which is hereby incorporated by reference in its entirety. This application also claims priority to and the benefit U.S. Provisional Application No. 62/024,416, entitled "Forward Looking Sonar Display", filed on Jul. 14, 2014, and U.S. Provisional Application No. 62/128,641, entitled "Methods And Apparatuses for Reconstructing a 3D Sonar Image", filed on Mar. 5, 2015, both of which are hereby incorporated by reference in their entireties.

FIELD OF THE INVENTION

Embodiments of the present invention relate generally to sonar systems and, more particularly, to a sonar system configured for imaging of an underwater environment relative to a watercraft.

BACKGROUND OF THE INVENTION

Sonar (SOund Navigation And Ranging) has long been used to detect waterborne or underwater objects. For example, sonar devices may be used to determine depth and bottom topography, detect fish, locate wreckage, etc. In this regard, due to the extreme limits to visibility underwater, sonar is typically the most accurate way to locate objects underwater. Sonar transducer elements, or simply transducers, may convert electrical energy into sound or vibrations at a particular frequency. A sonar pulse is transmitted into and through the water and is reflected from objects it encounters. The transducer may receive the reflected sound (the "sonar returns") and convert the sound energy into electrical energy. Based on the known speed of sound, it is possible to determine the distance to and/or location of the waterborne or underwater objects. The sonar return signals can also be processed to be displayed in graphical form on a display device, giving the user a "picture" of the underwater environment. The signal processor and display may be part of a unit known as a "sonar head" that is connected by a wire to the transducer mounted remotely from the sonar head. Alternatively, the sonar transducer may be an accessory for an integrated marine electronics system offering other features such as GPS, radar, etc.

Sonar systems may be used, in some cases, to create an image of an underwater environment. However, some sonar systems may be limited in their capabilities, such as requiring a watercraft to actively travel along the surface of the water in order to acquire the necessary sonar return data to form the image. As such, improved sonar systems are needed to provide for enhanced techniques for creating an image of an underwater environment.

BRIEF SUMMARY OF THE INVENTION

Some embodiments of the present invention provide sonar systems that are configured to enable rotation of a transducer array that includes at least two transducer elements. In some embodiments, the transducer array may be mounted to a trolling motor capable of being rotated. The transducer elements can be positioned to enable use of interferometry to obtain angle information regarding sonar returns. The angle and range of each sonar return can be used to form images, such as a 2D forward looking image of the underwater environment. A heading detector can be used to obtain a heading of the transducer elements to enable creation of a 2D radar-like image of the underwater environment. Additionally, the heading, angle, and range of the sonar returns can be used to form a 3D image of the underwater environment. In this regard, a robust sonar system is formed that allows for flexibility of image generation.

Accordingly, embodiments of the present invention provide a sonar system that is configured for imaging of an underwater environment relative to a watercraft.

According to one aspect of the present invention, a sonar system for imaging an underwater environment relative to a watercraft is provided. The sonar system comprises a housing and a transducer array positioned within the housing. The transducer array comprises a first transducer element configured to transmit one or more sonar pulses into the underwater environment. The first transducer element is further configured to receive first sonar returns from the sonar pulses and convert sound energy from the first sonar returns into first sonar return data. The transducer array further comprises a second transducer element configured to receive second sonar returns from the sonar pulses and convert sound energy from the second sonar returns into second sonar return data. The housing is mountable so as to enable rotation of the transducer array with respect to the watercraft. The sonar system further comprises a sonar signal processor configured to receive the first sonar return data and the second sonar return data. The sonar signal processor is further configured to generate a set of 2D sonar return data based on the first sonar return data and the second sonar return data by using interferometry to process the first sonar return data and the second sonar return data to determine an angle associated with each sonar return in the set of 2D sonar return data.

In some embodiments, the housing is mountable to at least one of a trolling motor or a steerable device.

In some embodiments, the angle is associated with a vertical angle between a theoretical plane corresponding to a surface of a body of water and the sonar return. Additionally, the first transducer element and the second transducer element may be vertically stacked within the housing and each define an emitting surface that is aimed at approximately a same angle with respect to the surface of the body of water. Additionally, the first transducer element and the second transducer element may each define a rectangular shape and be configured to transmit and/or receive a fan-shaped sonar beam. The fan-shaped sonar beam may define a beamwidth of approximately 15° in a horizontal direction and approximately 90° in a vertical direction.

In some embodiments, the sonar system further comprises a third transducer element configured to receive third sonar returns from the sonar pulses and convert sound energy from the third sonar returns into third sonar return data. The sonar signal processor may be further configured to receive the third sonar return data and generate the set of 2D sonar return data further based on the third sonar return data by using interferometry to process the first sonar return data, the second sonar return data, and the third sonar return data to determine the angle associated with each sonar return in the set of 2D sonar return data.

In some embodiments, the sonar signal processor may be configured to generate, based on the set of 2D sonar return data, 2D forward looking sonar image data associated with a 2D forward looking image of the underwater environment.

The 2D forward looking image may represent, at least, depth contours of a portion of the underwater environment in front of the transducer array.

In some embodiments, the sonar system further comprises a heading sensor configured to detect a heading of the transducer array. The set of 2D sonar return data may be associated with the detected heading when the sonar returns associated with the set of 2D sonar return data are captured and the sonar signal processor may be configured to generate, based on the set of 2D sonar return data and the detected heading, 3D sonar image data associated with a 3D image of the underwater environment. Additionally, the sonar signal processor may be configured to generate the 3D image data by positioning at least a portion of the set of 2D sonar return data as a theoretical vertical 2D slice at an angle with respect to a point in the 3D image corresponding to a position of the transducer array, wherein the angle is determined based on the detected heading. Additionally or alternatively, the sonar signal processor may be configured to generate the 3D image data by processing at least a portion of the set of 2D sonar return data with at least a portion of a second set of 2D sonar return data to generate a 3D representation of at least a portion of the underwater environment.

In some embodiments, the sonar system may further comprise a heading sensor configured to detect a heading of the transducer array. The at least one of the first sonar return data or the second sonar return data may be associated with the detected heading when the respective at least one of first sonar returns or second sonar returns are captured and the sonar signal processor may be configured to generate, based on the at least one of the first sonar return data or the second sonar return data and the detected heading, 2D radar-like sonar image data associated with a 2D radar-like image of the underwater environment.

In some embodiments, the first and second transducer elements may each be configured to receive respective first and second sonar returns from the sonar pulses while the first and second transducer elements are rotated at variable speeds.

In some embodiments, the first and second transducer elements may each be configured to receive respective first and second sonar returns from the sonar pulses while the first and second transducer elements are rotated at a user-defined speed.

In some embodiments, the sonar system may further comprise a heading sensor configured to detect a heading of the transducer array. The set of 2D sonar return data may be associated with the detected heading when the sonar returns associated with the set of 2D sonar return data are captured and at least one of the first sonar return data or the second sonar return data may be associated with the detected heading when the respective at least one of first sonar returns or second sonar returns are captured. The sonar signal processor may be configured to generate at least one of: 2D forward looking sonar image data associated with a 2D forward looking image of the underwater environment based on the set of 2D sonar return data, wherein the 2D forward looking image represents, at least, depth contours of a portion of the underwater environment in front of the transducer array; 2D radar-like sonar image data associated with a 2D radar-like image of the underwater environment based on the at least one of the first sonar return data or the second sonar return data and the detected heading; or 3D sonar image data associated with a 3D image of the underwater environment based on the set of 2D sonar return data and the detected heading. Additionally, the sonar system may further comprise a display configured to display at least one of the 2D forward looking image, the 2D radar-like image, or the 3D image. Additionally, the display may be configured to display, on a single screen, at least two of the 2D forward looking image, the 2D radar-like image, or the 3D image. Additionally, the display may be configured to display chart information on a single screen with the at least one of the 2D forward looking image, the 2D radar-like image, or the 3D image.

According to another aspect of the present invention, a sonar transducer assembly for imaging an underwater environment relative to a watercraft is provided. The sonar transducer assembly comprises a housing and a transducer array positioned within the housing. The transducer array comprises a first transducer element configured to transmit one or more sonar pulses into the underwater environment. The first transducer element is further configured to receive first sonar returns from the sonar pulses and convert sound energy from the first sonar returns into first sonar return data. The transducer array comprises a second transducer element configured to receive second sonar returns from the sonar pulses and convert sound energy from the second sonar returns into second sonar return data. The housing is mountable so as to enable rotation of the transducer array with respect to the watercraft. The sonar transducer assembly further comprises a sonar signal processor configured to receive the first sonar return data and the second sonar return data. The sonar signal processor is further configured to generate a set of 2D sonar return data based on the first sonar return data and the second sonar return data by using interferometry to process the first sonar return data and the second sonar return data to determine an angle associated with each sonar return in the set of 2D sonar return data.

According to another aspect of the present invention, method for imaging an underwater environment relative to a watercraft is provided. The method comprises transmitting one or more sonar pulses into the underwater environment from a first transducer element of a transducer array. The transducer array is positioned within a housing. The housing is mountable so as to enable rotation of the transducer array with respect to the watercraft. The method further comprises receiving first sonar returns from the sonar pulses with the first transducer element, wherein the first transducer element is configured to convert sound energy from the first sonar returns into first sonar return data. The method further comprises receiving second sonar returns from the sonar pulses with a second transducer element of the transducer array. The second transducer element is configured to convert sound energy from the second sonar returns into second sonar return data. The method further comprises receiving the first sonar return data and the second sonar return data with a sonar signal processor. The method further comprises generating, by the sonar signal processor, a set of 2D sonar return data based on the first sonar return data and the second sonar return data by using interferometry to process the first sonar return data and the second sonar return to determine an angle associated with each sonar return in the set of 2D sonar return data.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION OF THE INVENTION

Figure 1:
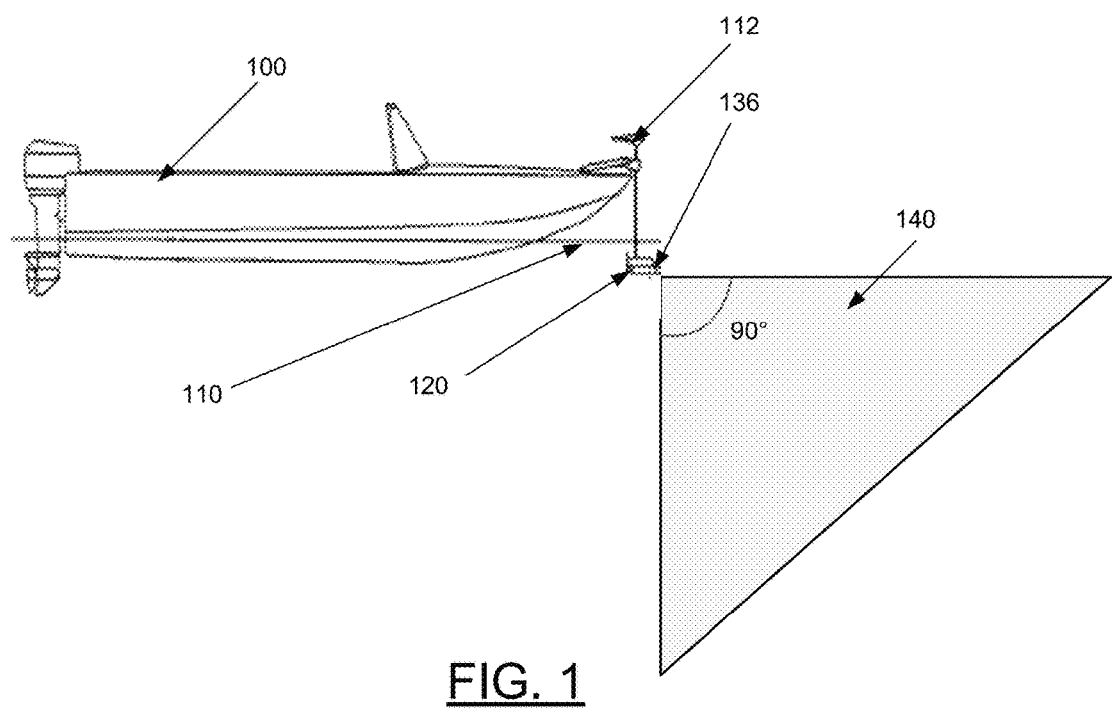
FIG. 1 is an illustration of an example sonar transducer emitting one or more sonar pulses from a transducer assembly mounted relative to a watercraft.

Exemplary embodiments of the present invention now will be described more fully hereinafter with reference to the accompanying drawings, in which some, but not all embodiments of the invention are shown. Indeed, the invention may be embodied in many different forms and should not be construed as limited to the exemplary embodiments set forth herein; rather, these embodiments are provided so that this disclosure will satisfy applicable legal requirements. Like reference numerals refer to like elements throughout.

Sonar systems, such as sonar depth finders, sidescan sonars, downscan sonars, and sonar fish finders, are commonly employed by boaters, sport fishermen, search and rescue personnel, researchers, surveyors, and others. Some embodiments of the present invention provide sonar systems that are configured to enable rotation of a transducer array that is formed of at least two transducer elements. FIG. 1 illustrates an example sonar system that includes a transducer assembly 136 that is mounted to a trolling motor 120 of a watercraft 100 floating on a surface 110 of a body of water.

As described in greater detail herein, in some embodiments, the transducer assembly 136 may include a transducer array with at least two transducer elements. The transducer elements may each be configured to transmit one or more sonar pulses and/or receive sonar returns within a beam pattern. The sonar returns may be processed using interferometry to help determine the position from which each sonar return originated. In some embodiments, the return data may generate an angle from the transducer to each position from which the returns are received with respect to a theoretical plane (e.g., corresponding to a surface of a body of water).

FIG. 1 shows an example beam pattern 140 of 90° in the vertical direction. Additionally, the transducer array is oriented forwardly and downwardly from the housing and mounting position on the trolling motor. A user may direct the facing of the transducer assembly 136 by rotating the trolling motor 120, such as by the shaft 112. Thus, depending on the direction the transducer assembly 136 is facing, the user can obtain an image of the relative portion of the underwater environment. As described in greater detail herein, the sonar returns from the transducer array can be used to generate a number of different images that portray information regarding the underwater environment, which can be useful for fishing and watercraft control.

Example System Architecture

Figure 2:
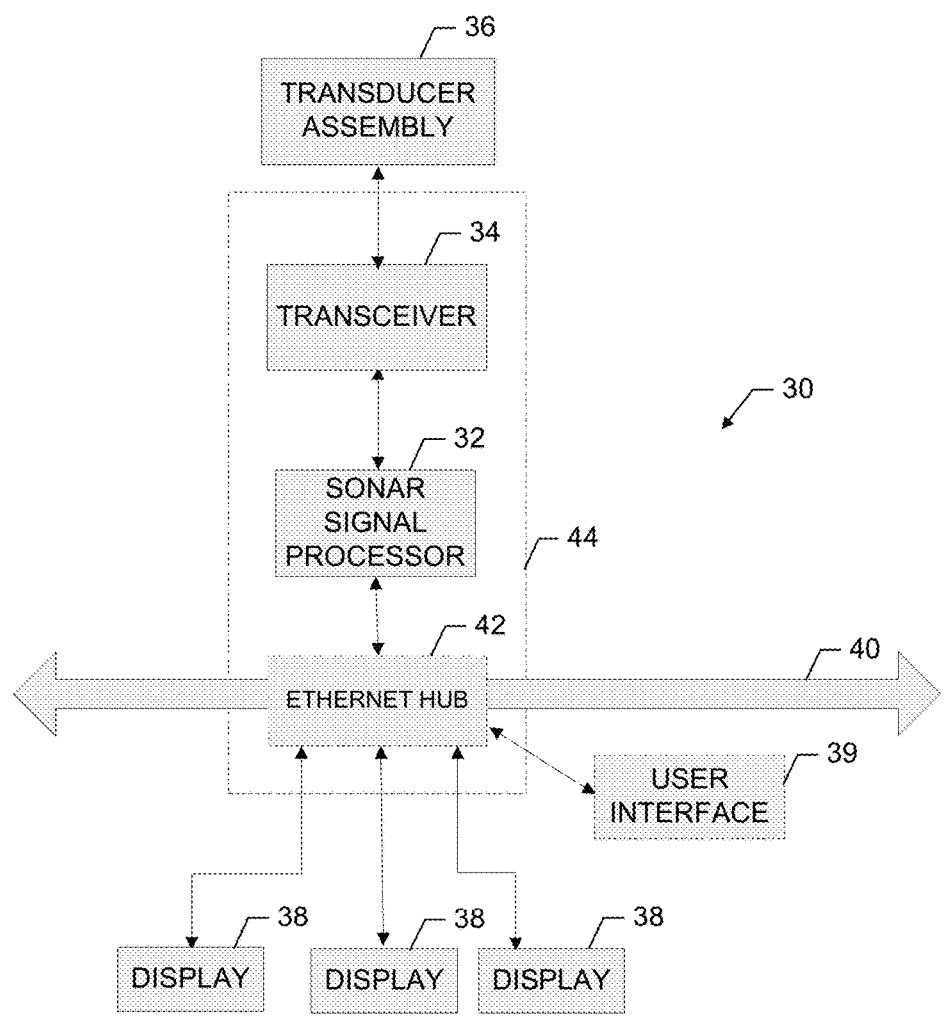
FIG. 2 is a basic block diagram illustrating an example sonar system, in accordance with example embodiments described herein.

FIG. 2 is a basic block diagram illustrating a sonar system 30 capable for use with multiple example embodiments of the present invention. As shown, the sonar system 30 may include a number of different modules or components, each of which may comprise any device or means embodied in either hardware, software, or a combination of hardware and software configured to perform one or more corresponding functions. For example, the sonar system 30 may include a sonar signal processor 32, a transceiver 34 and a transducer assembly 36 and/or numerous other peripheral devices such as one or more multi-function displays 38. One or more of the modules may be configured to communicate with one or more of the other modules to process and/or display data, information or the like from one or more of the modules. The modules may also be configured to communicate with one another in any of a number of different manners including, for example, via a network 40. In this regard, the network 40 may be any of a number of different communication backbones or frameworks including, for example, Ethernet, the NMEA 2000 framework or other suitable networks. The network may also support other data sources, including GPS, autopilot, engine data, compass, radar, etc.

The display 38 may be configured to display images and may include or otherwise be in communication with a user interface 39 configured to receive an input from a user. The display 38 may be, for example, a conventional LCD (liquid crystal display), a touch screen display, or any other suitable display known in the art upon which images may be rendered. Although each display 38 of FIG. 2 is shown as being connected to the sonar signal processor 32 via the network and/or via an Ethernet hub, the display 38 could alternatively be in direct communication with the sonar signal processor 32 in some embodiments, or the display 38, sonar signal processor 32 and user interface 39 could be in a single housing. The user interface 39 may include, for example, a keyboard, keypad, function keys, mouse, scrolling device, input/output ports, touch screen, or any other mechanism by which a user may interface with the system. Moreover, in some cases, the user interface 39 may be a portion of one or more of the displays 38.

Figure 2A:
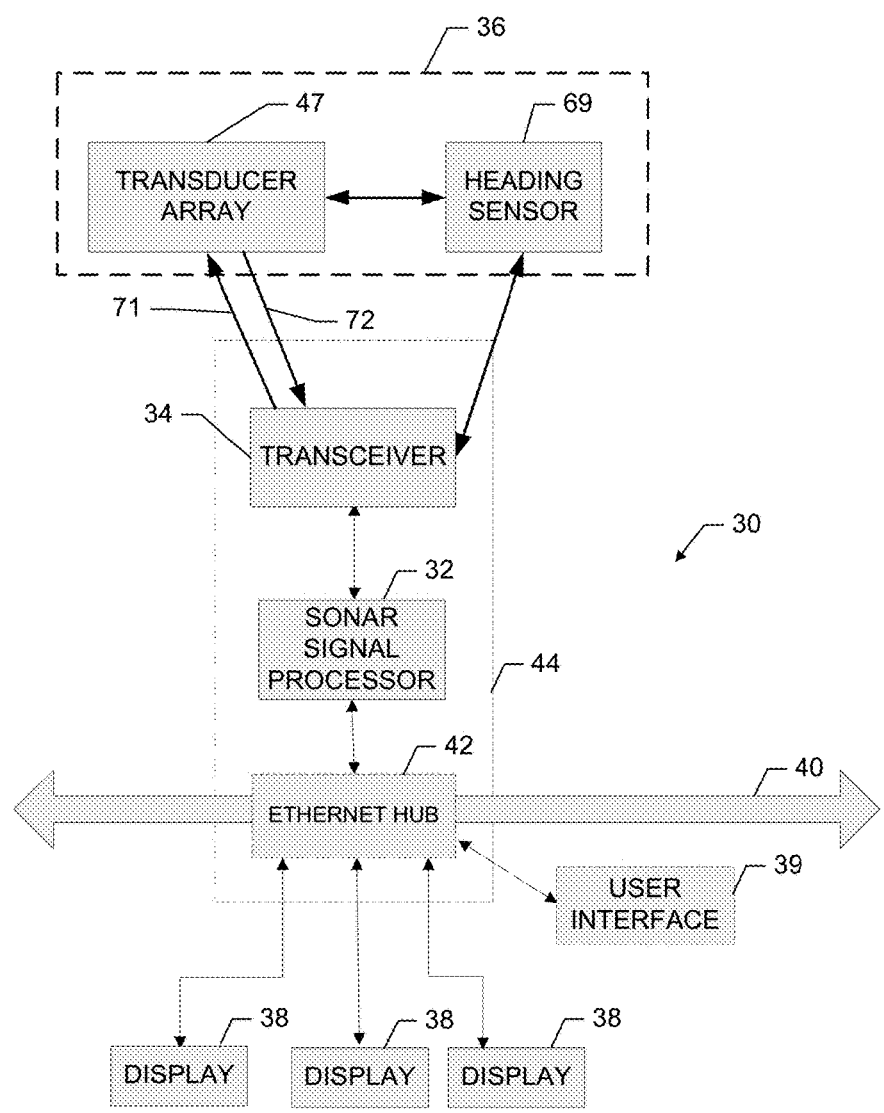
FIG. 2A is a basic block diagram illustrating another example sonar system, in accordance with example embodiments described herein.

In some embodiments, with reference to FIG. 2A, the transducer assembly 36 may include a heading sensor 69 that detects the heading of the transducer assembly. In this regard, a detected heading can be linked to captured sonar returns for use in image generation, as will be described in greater detail herein.

Figure 3:
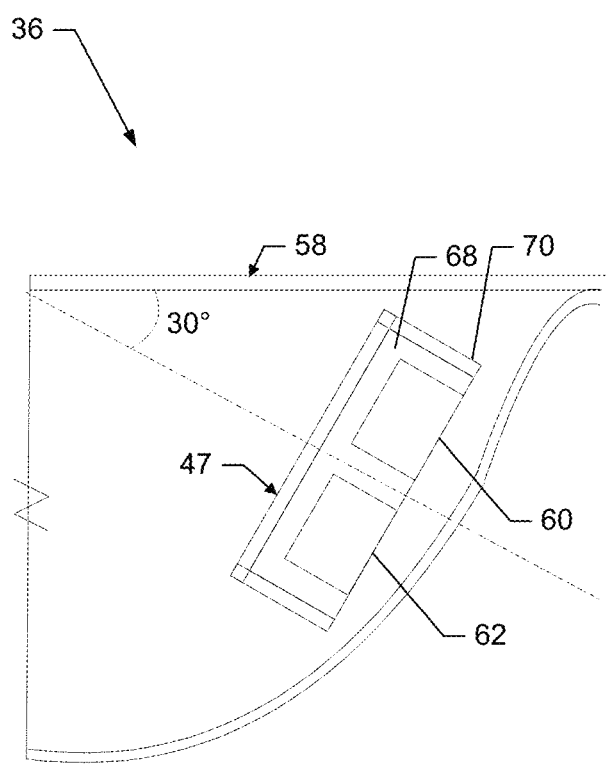
FIG. 3 illustrates a cross section of an example transducer assembly, in accordance with example embodiments described herein.

The transducer assembly 36, with continued reference to FIG. 2A, may also include one or more transducer elements positioned within the housing as a transducer array 47. FIG. 3 illustrates a cross-sectional view of an example transducer assembly 36. The example transducer array 47 is shown having two transducer elements 60, 62.

The emitting faces of each transducer element 60, 62 may be oriented downwardly and outwardly as shown. In this regard, the transducer array 47 may be held at a predetermined angle relative to the surface of the body of water. For example, the emitting surfaces of the transducer array 47 may be oriented at 30 degrees from the surface of the body of water in order to transmit and/or receive sonar pulses. The transducer elements 60, 62 may also be positioned at a predetermined distance from each other (e.g., a predetermined distance between the centers of the transducer elements, also referred to as element pitch). The predetermined distance may be designed based on the frequency or wavelength of the sonar pulses. For example, the predetermined distance between the transducer elements 60, 62 may be a fraction or multiple of the wavelength of the sonar pulses (e.g., ¹⁄₁₀, ⅛, ⅙, ¼, ½, 1, 2, 3, or 4 times the wavelength). In some embodiments, the predetermined distance may be less than or equal to half the wavelength of the sonar pulses, as discussed below.

Figure 3A:
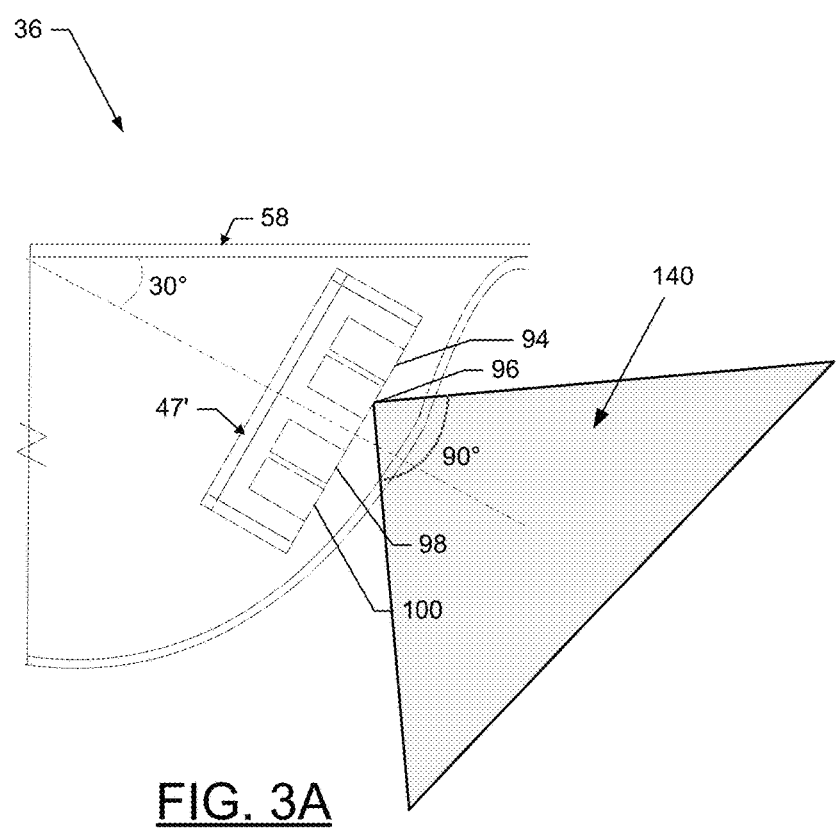
FIG. 3A illustrates a cross section of another example transducer assembly, wherein an example sonar beam extends from one of the transducer elements of the transducer assembly, in accordance with example embodiments described herein.

In some embodiments, the transducer arrays may include more than two transducer elements. For example, FIG. 3A shows an embodiment of the transducer array 47' having four transducer elements 94, 96, 98, 100. The array 47' may further include absorption material and shielding. Each of the transducer elements 94, 96, 98, 100 may be positioned a predetermined distance from each other. In some embodiments, the distance between elements may differ.

In some embodiments, the third 98 and fourth 100 transducer elements may be electrically connected in parallel to act as a single element. For example, the third 98 and fourth 100 transducer elements 98, 100 may be connected in parallel to act as a single element. In such embodiments, the combination of elements 98 and 100 may be referred to as a single transducer element.

The transducer elements 94, 96, 98, 100 may be electrified substantially simultaneously to receive the sonar returns and then convert sound energy from the sonar returns into respective sonar return data that is provided to the sonar signal processor.

In some embodiments, the transducer elements are vertically stacked within the housing such that their longitudinal lengths extend in the horizontal direction. Such a configuration produces a beam pattern that has a fan-shaped beam with a larger beamwidth in the vertical plane and a smaller beamwidth in the horizontal plane. As shown in FIGS. 3 and 3A, the emitting surface of each transducer element may be aimed at the same angle with respect to the surface of the body of water (e.g., 30° in FIGS. 3 and 3A).

In some embodiments detailed herein, a single sonar pulse may be transmitted such that all of the transducer elements may receive sonar returns (e.g., a pulse that is long enough for each set of pairwise elements to receive), or, alternatively, multiple pulses may be transmitted. In some embodiments, any or all of the transducer elements may be configured to transmit one or more sonar pulses into the underwater environment. For example, with reference to FIG. 3A, the second transducer element 96 is transmitting a sonar pulse within the beam pattern 140 that defines 90° in the vertical plane and 15° in the horizontal plane (shown in FIG. 4A). In some embodiments, the electrically coupled transducer elements (e.g., elements 98, 100) may be configured to transmit sonar pulses into the water. The designed beam pattern for the transmitted sonar pulses may be configured to ensonify a region of the underwater environment that causes sonar returns to be received within the receive beam of each of the transducer elements 94, 96, 98, 100.

Additional examples of transducer array orientations, configurations, processing, and other information may be found in U.S. patent application Ser. No. 14/618,987 filed Feb. 10, 2015, and entitled "A Transducer Array having a Transceiver," which reference is hereby incorporated by reference herein in its entirety.

Figure 4A:
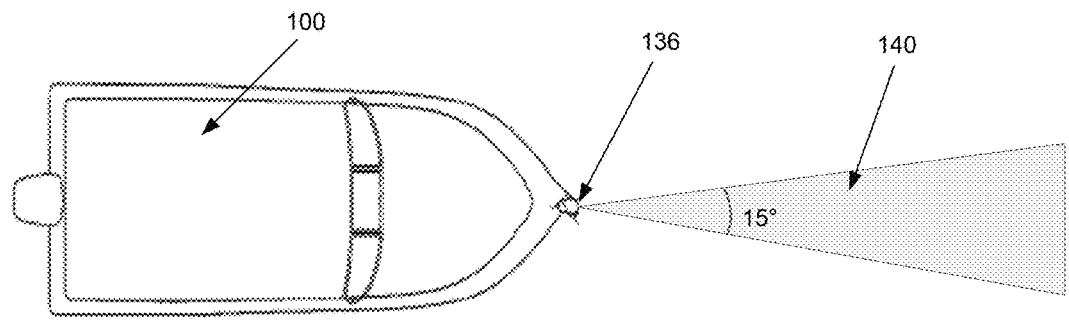
FIG. 4A illustrates a top view of a watercraft and an example sonar transducer assembly attached to a trolling motor of the watercraft, wherein the transducer assembly is shown emitting an example sonar beam, in accordance with example embodiments described herein.
Figure 4B:
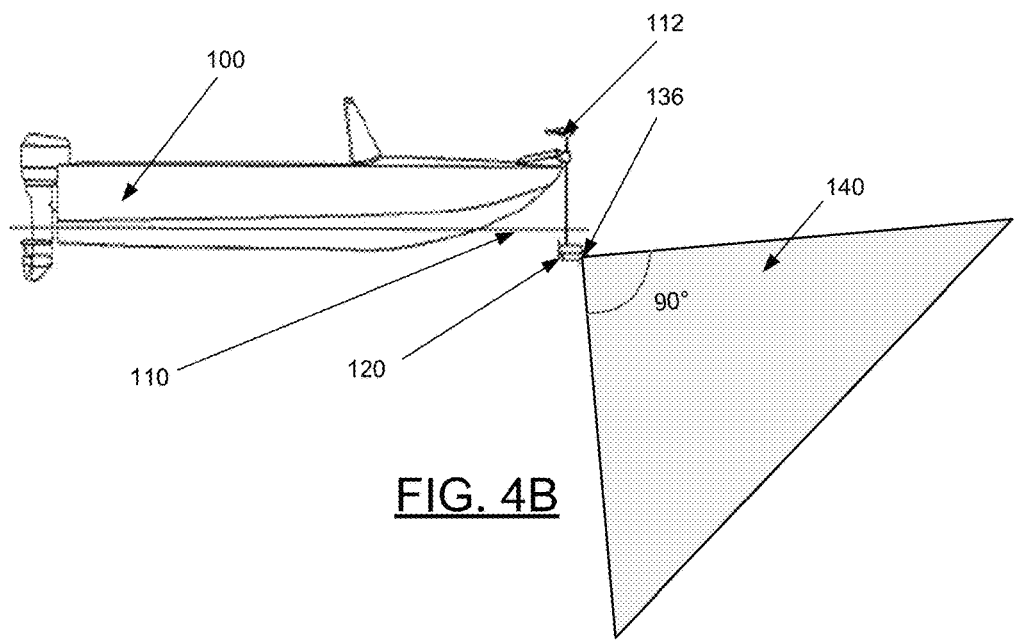
FIG. 4B illustrates a side view of the watercraft, sonar transducer assembly, and sonar beam pattern of FIG. 4A, in accordance with example embodiments described herein.
Figure 4C:
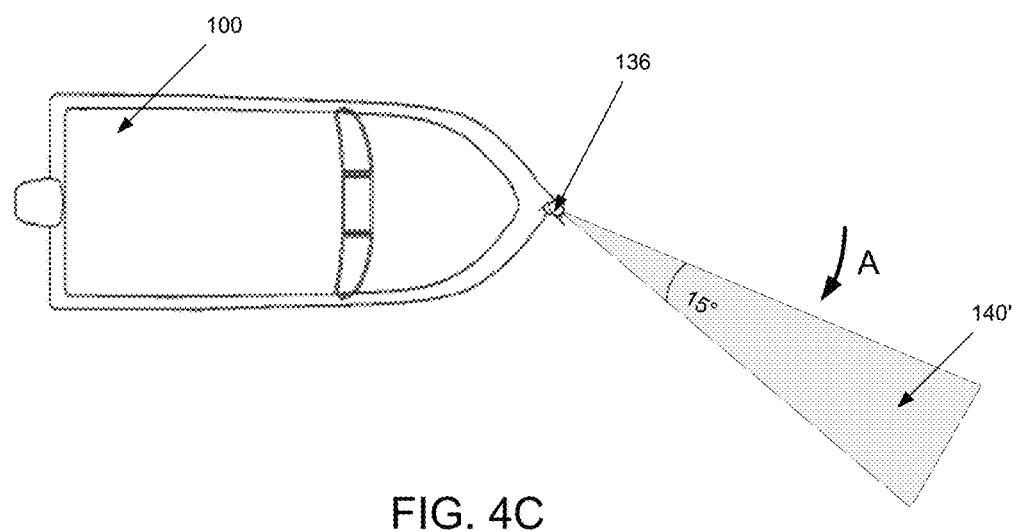
FIG. 4C illustrates a top view of the watercraft and sonar transducer assembly of FIG. 4A, wherein the trolling motor has been rotated along arrow A such that the sonar beam pattern has also been rotated, in accordance with example embodiments described herein.

As noted above, some embodiments of the present invention provide a sonar transducer assembly configured for 360 degree imaging of an underwater environment under a watercraft. FIGS. 4A, 4B, and 4C illustrate an example sonar transducer assembly 136 mounted to a trolling motor 120 of a watercraft 100.

Example Rotational Mounting

As noted above, in some embodiments, the sonar transducer assembly 36 may comprise a housing that is mountable to a watercraft (or device mounted to a watercraft) so as to enable rotation of the transducer elements with respect to the watercraft. With reference to FIGS. 4A, 4B, and 4C, the transducer assembly 136 may be mounted to a trolling motor 120 such that the transducer assembly 136 (and the transducer elements contained therein) may be rotated up to 360 degrees with respect to the watercraft 100 along with the trolling motor 120. For example, with reference to FIG. 4A, the transducer assembly 136 and the trolling motor 120 may be aimed to transmit sonar pulses and/or receive sonar returns (e.g., defined by the beam pattern 140) generally forward from the watercraft 100. However, with reference to FIG. 4C, the sonar transducer assembly 136 may be rotated (e.g., along arrow A) such that the transducer assembly 136 is aimed to transmit sonar pulses and/or receive sonar returns (e.g., defined by the beam pattern 140) generally 45 degrees clockwise from forward of the watercraft 100. This rotation may continue such that the transducer assembly 136 may transmit sonar pulses and receive sonar returns from any angle with respect to forward from the watercraft (e.g., the transducer assembly 136 may rotate 360 degrees).

Though the above described embodiment details a sonar transducer assembly mounted to a trolling motor to enable rotation, some embodiments of the present invention contemplate other ways to enable rotation of the transducer elements. Moreover, rotation may be achieved by any means (e.g., a motor, manually, steerable device, etc.).

Additionally, as noted above, some embodiments of the present invention provide a transducer assembly that enables imaging while the transducer assembly rotates at variable speeds. Further, in some embodiments, the sonar transducer assembly may provide imaging while being rotated continuously (e.g., without pauses). Moreover, in some embodiments, the transducer assembly may provide imaging while being rotated at a user-defined speed. Such ability is enabled due to the width of the beam pattern in the horizontal direction. In the example shown in FIG. 4A, the beam pattern defines 15°, which is large enough to enable receipt of sonar returns while still accounting for an unknown (and perhaps fast) change in direction due to rotation of the transducer assembly. Said differently, due to the time delay of sound and the unknown rotational speed of the transducer assembly, it is difficult to predict where the sonar pulses need to be for receipt by the transducer elements to capture adequate sonar returns. Thus, the depicted embodiment of FIG. 4A enables 15 degrees of sonar pulses to account for the time delay of sound and the unknown rotational speed of the transducer assembly. In such a regard, even though the transducer assembly may be actively rotating, the transducer elements may receive sonar returns with adequate detail to produce an image.

Though the above described embodiments detail 15 degrees of sonar pulses, some embodiments contemplate other configurations. Further, some embodiments of the present invention may utilize a separate transmit transducer element, such as to provide for a wider horizontal beam pattern, while still enabling narrower (and more defined) sonar returns for imaging.

Example Image Processing

As noted above, some embodiments of the present invention comprise a sonar signal processor. In some embodiments, the sonar signal processor is configured to receive sonar return data resulting from the transducer elements in the transducer array. Additionally, in some embodiments, the sonar signal processor is further configured to generate one or more images (or image data corresponding to one or more images) of the underwater environment based on the received sonar return data and/or other information (e.g., a detected heading from the heading sensor).

In some embodiments, the sonar signal processor is configured to generate 2D radar-like sonar image data, 2D forward looking sonar image data, and/or 3D sonar image data. As detailed herein, the corresponding 2D radar-like image, 2D forward looking image, and/or 3D image can be displayed to a user on a display (e.g., separately, split-screen mode, etc.). Additionally, in some embodiments, other information (e.g., depth, temperature, etc.) may be displayed with one or more of the generated images. Additionally, in some embodiments, chart information, GPS information, navigation information, among others may be displayed with one or more of the generated images. In this regard, some embodiments of the present invention provide for robust imaging options that are useful for fisherman and boaters.

Example 2D Radar-Like Imaging

In some embodiments, the sonar signal processor is configured to generate 2D radar-like sonar image data corresponding to a 2D radar-like image of the underwater environment. In some embodiments, the 2D radar-like image is formed as a composite of sonar returns respectively arranged in positions corresponding to the rotation of the sonar transducer assembly. As the sonar transducer assembly rotates, the transducer elements may capture sonar returns. These sonar returns (which include a range) may be processed and formed into sonar image data by the sonar signal processor. The resulting image of the underwater environment may be generated by arranging the resulting sonar images in the proper order that corresponds with the position and heading of the transducer elements when receiving the sonar returns.

Along these lines, in some embodiments, the sonar transducer assembly may comprise a heading sensor configured to detect the heading of the transducer elements. The detected heading may be associated with sonar returns captured by the transducer elements. Further, the detected heading may be transmitted to the sonar signal processor for aiding in arranging of the sonar images corresponding to each set of captured sonar returns. For example, each sonar image may have an associated heading that enables the sonar signal processor to determine its arrangement to create the 2D radar-like image of the underwater environment. Further, in some embodiments, the sonar signal processor may take into account the relative heading of the watercraft as compared to the heading of the associated sonar returns when creating the image.

Figure 5:
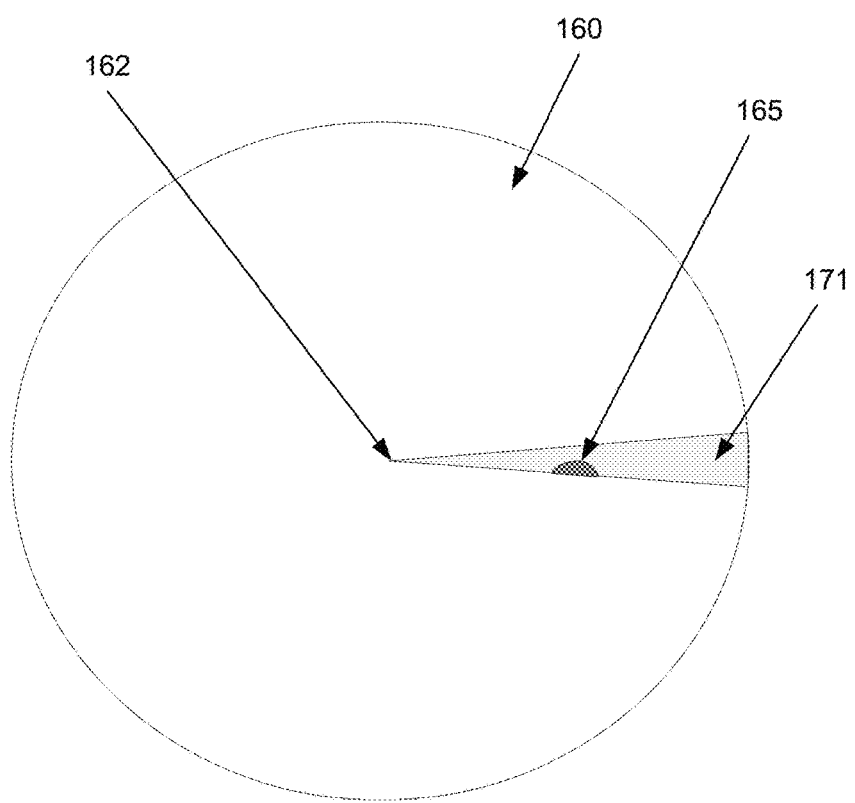
FIG. 5 is a diagram illustrating an example image of an underwater environment, wherein a sonar image indicative of sonar returns of the underwater environment is being displayed, in accordance with example embodiments described herein.

FIG. 5 shows a diagram illustrating an example display of an underwater environment. The transducer assembly may be positioned at 162 and aimed such that the transducer elements received sonar returns in a heading associated with a first volume 171. The sonar signal processor may process the sonar returns associated with the first volume 171 and, using the heading, position the sonar image of the first volume 171 of the underwater environment 160. The sonar image of first volume 171 may include a portion of an object 165.

Figure 5A:
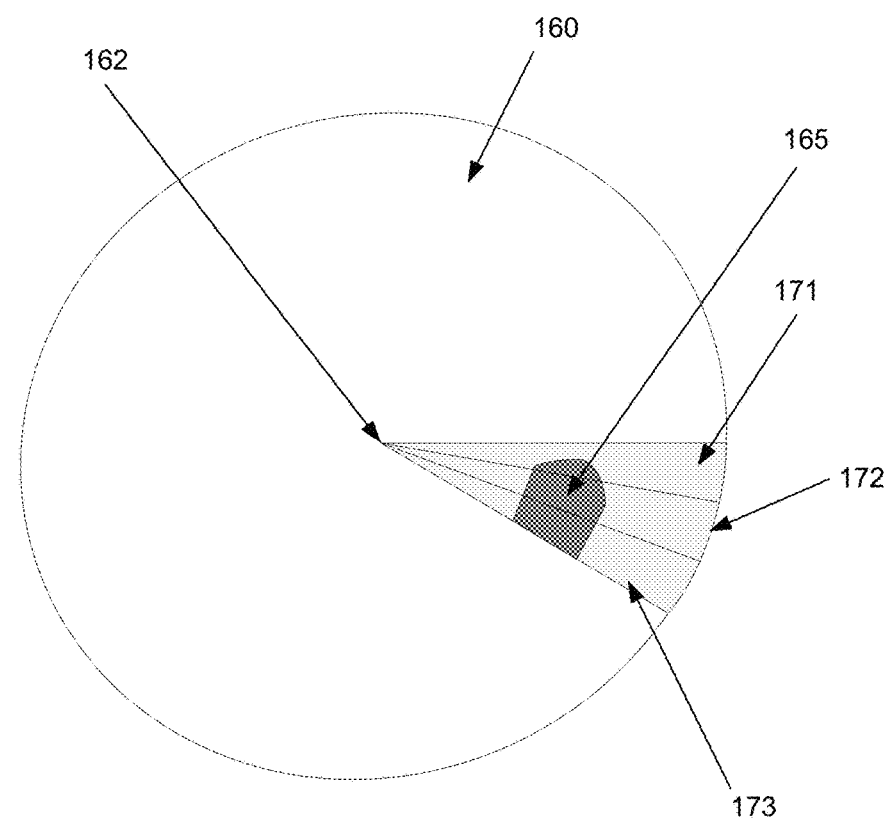
FIG. 5A is a diagram illustrating the display of the underwater environment in FIG. 5, wherein three consecutive sonar images, each being indicative of a different volume of the underwater environment, are being displayed, in accordance with example embodiments described herein.

With reference to FIG. 5A, as the transducer assembly rotates clockwise, additional sonar images may be arranged on the screen 160. In the depicted embodiment, the transducer elements may have rotated slightly clockwise to capture sonar returns within a second volume 172. Further, the transducer elements may have rotated slightly clockwise again to capture sonar returns within a third volume 173. The sonar signal processor may process the sonar returns associated with second and third volumes 172 and 173 and, using the respective headings, position the sonar images of the volumes 172 and 173 on the screen 160 to further define the image. As shown in FIG. 5A, further detail of the object 165 can be seen with the addition of the sonar images from second and third volumes 172 and 173. In such a regard, as the transducer assembly rotates, the image of the underwater environment can be further defined (e.g., until it is complete).

Figure 6:
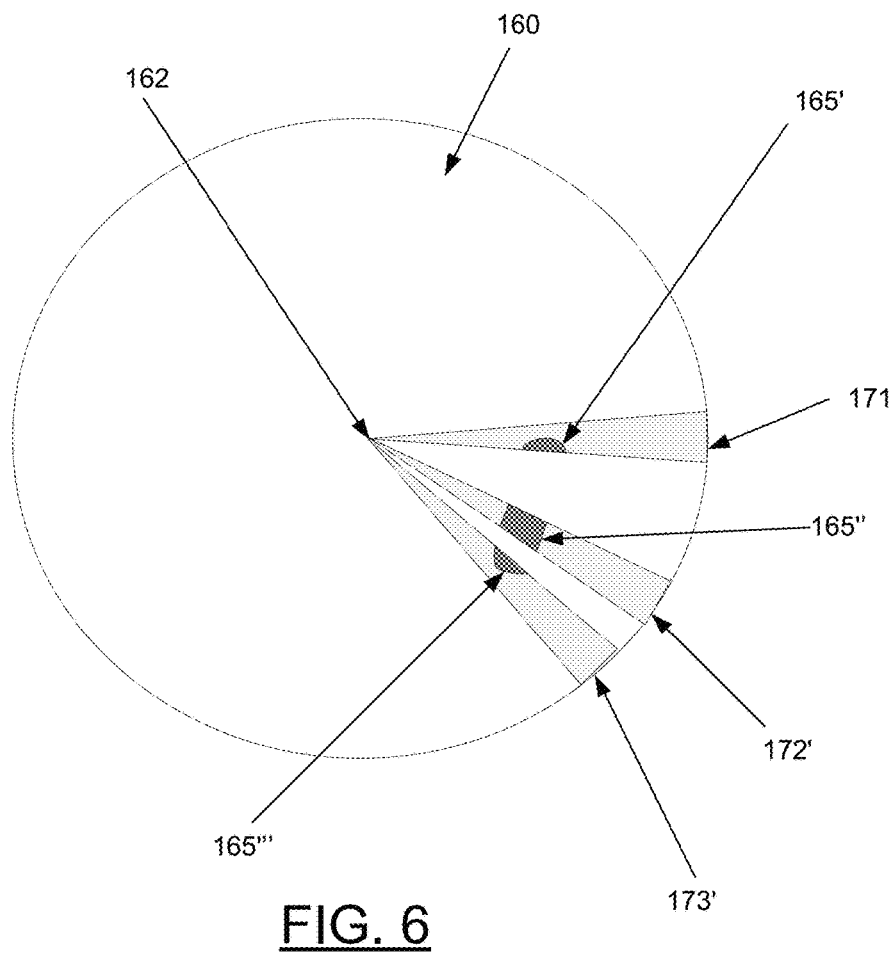
FIG. 6 is a diagram illustrating the display of the underwater environment in FIG. 5, wherein three sonar images, each being indicative of a different volume of the underwater environment, are being displayed, in accordance with example embodiments described herein.

As noted above, some embodiments of the present invention seek to provide a transducer assembly that enables imaging while the transducer assembly rotates at variable speeds. In such a regard, as is consistent with the above disclosure, the receive-only transducer element may capture sonar returns from volumes that are not consecutively positioned. For example, the speed at which the transducer assembly is rotating may cause gaps to occur between the sonar returns. The sonar signal processor, in some embodiments, may be configured to account for such gaps when creating the image of the underwater environment. Indeed, use of the detected heading associated with the sonar returns may aid in proper arrangement of each sonar image of each respective volume. For example, FIG. 6 illustrates an image of the same underwater environment 160 shown in FIG. 5A. However, the transducer assembly has rotated at variable speeds such that the sonar images of the second and third volumes 172' and 173' are different than that of the second and third volumes 172 and 173 shown in FIG. 5A. In this regard, the sonar signal processor has accounted for the variable speed of rotation by properly arranging the sonar images of the second and third volumes 172' and 173' on the screen 160 using their respective headings. For example, in the depicted embodiment, the object 165 is shown in pieces of 165' and 165" in volumes 172' and 173' respectively.

Example 2D Forward Looking Imaging

In some embodiments, the sonar signal processor is configured to generate 2D forward looking sonar image data corresponding to a 2D forward looking image of the underwater environment. In some embodiments, the 2D forward looking image is formed as a composite of sonar returns respectively arranged as the sonar returns are captured (e.g., in waterfall form).

The sonar returns used to generate the corresponding 2D forward looking sonar image data are received with at least a first transducer element and a second transducer element. The sonar returns define a range. Interferometry between the corresponding first sonar returns from the first transducer element and second sonar returns from the second transducer element is used to define an angle associated with each sonar return. Depending on the orientation of the transducer elements, two transducer elements stacked with respect to each other in a direction can be used to determine an angle of a sonar return based on differences between the returned information for each sonar return relative to the different transducer elements. For example, in the embodiments shown in FIG. 3, the transducer element 60 is vertically stacked above transducer element 62. Due to the shape of the resulting beam pattern, there are ~90° of sonar return information in the vertical plane being received by both transducer elements 60, 62. Thus, having vertically stacked transducer elements 60, 62 allows differentiation between the angles of sonar returns within the 90° beam pattern in the vertical plane. In this manner, the calculated angle may be associated with a vertical angle between a theoretical plane corresponding to a surface of a body of water and the sonar return (with the transducer assembly as the center point).

The resulting angle and range information for the sonar return data can be used by the sonar signal processor to generate the 2D forward looking sonar image data that results in the 2D forward looking image. Such an image is useful for providing pertinent navigation and fishing information to a user.

Figure 7:
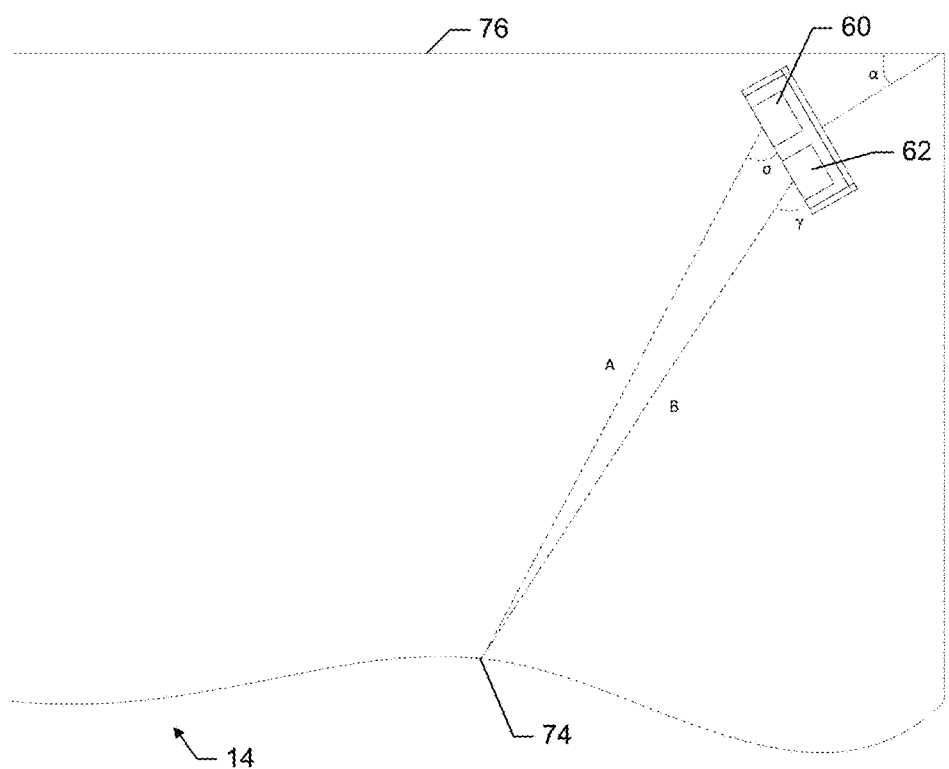
FIG. 7 shows an example simplified transducer array receiving returns from a floor of a body of water, in accordance with some example embodiments described herein.
Figure 8:
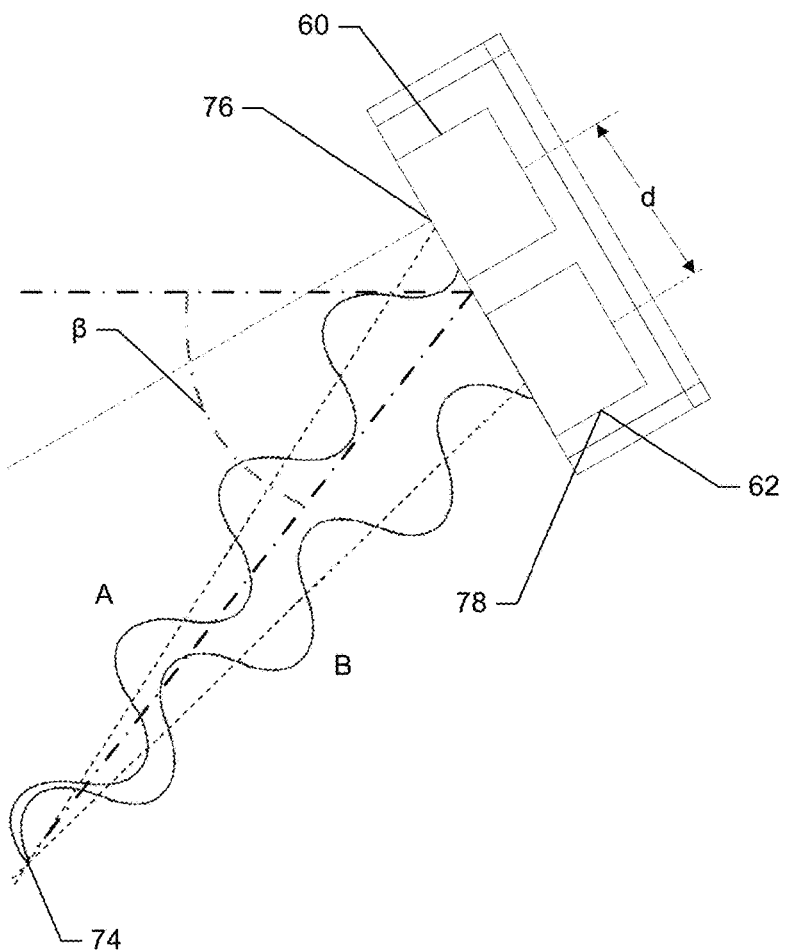
FIG. 8 shows the transducer array of FIG. 7 having illustrated waves being received by the transducer elements, in accordance with some example embodiments described herein.
Figure 9:
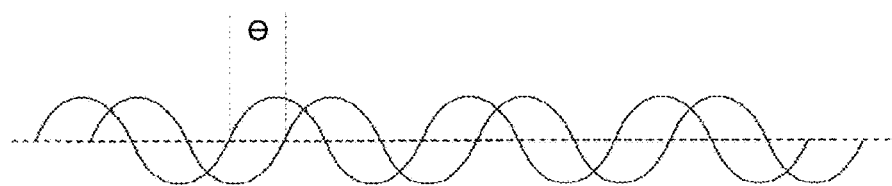
FIG. 9 shows a linear transposition of the two waves of FIG. 8, in accordance with some example embodiments described herein.

With reference to FIGS. 7-9, the following is an explanation of an example use of interferometry to determine corresponding angles of the sonar returns. Turning to FIG. 7, a simplified example is shown of the transducer elements 60, 62 receiving returns from a single point 74 on the floor of the body of water or other reflecting surface to generate a point of return data including a distance and/or time to the point as well as an angle α. During actual interferometric sonar sounding, sonar returns may be received from across the entire beam width of the transmitted sonar pulses to generate a plurality of points of return data in two-dimensional slices from each transmitted sonar pulse. The returns A, B may originate at the same time from the same point 74 and be received by the first 60 and second 62 transducer elements respectively.

Each of the transducer elements 60, 62 may produce one-dimensional distance data in response to receiving sonar returns A, B, respectively, from the point 74. The sonar signal processor may combine this one-dimensional distance data from each element with the predetermined distance between the elements and the angle α between the orientation of the transducer array and the surface of the body of water to determine the position of the point 74 of origin of the sonar return. The position of the point 74 may be represented as two-dimensional coordinates with respect to the boat or housing, or may alternatively be represented as a distance and angle from the boat or housing. In yet another embodiment, the position may be determined as an absolute position value by comparing the interferometric data with GPS or other positioning data.

In some embodiments, the location of the point of origin for the sonar returns may be determined via a phase difference between the returns received at the respective transducer elements 60, 62. Turning to FIG. 8, another simplified example of a transducer array receiving sonar returns A, B is shown. In this embodiment, the sonar returns from the point 74 are represented as waves A, B received by the first 60 and second 62 transducer elements. The returns A, B originating from the same point 74 on the floor of the body of water or other reflecting surface may have substantially the same frequency, amplitude, and wavelength. Given that the waves A, B may be expected to have the same properties when received at both the first 60 and second 62 transducer element, a phase difference between the two waves, in combination with the predetermined distance and angle of the transducer array, may provide the location of their point 74 of origin. As shown in FIG. 8, the returns A, B may be received by the respective transducer elements 60, 62 at different positions 76, 78 along the respective waves. The phase, or position, of the wave at the point it is received by the transducer elements may be compared to determine the angle of the point 74 of origin. In some embodiments, the angle (e.g., β shown in FIG. 8) may be derived by using an interferometer (e.g., as part of or separate from the sonar signal processor) to calculate a phase difference between the two returns which is converted into a single physical angle, which would be the angle from the seafloor point to the phase center of the array (the imaginary point directly between the two transducer elements being used for the interferometry calculation).

FIG. 9 shows a plot overlaying the returns A, B as received by each transducer element 60, 62 versus time. The phase difference θ between the returns A, B may indicate the degree of offset between the returns, which, when combined with the predetermined distance d, one-dimensional distance data, frequency of the returns, and/or angle of the transducer arrays may produce the position of the point 74 of origin. The angle β to the point 74 may be represented by the following Equation (1):

$$\beta = \arcsin\left(\frac{\lambda\theta}{2\pi d}\right) \quad (1)$$

Where λ represents the wavelength of the return, θ represents the received phase difference, and d represents the predetermined distance.

Though the above explanation focuses on two transducer elements, three or more transducer elements (e.g., transducer elements 94, 96, 98, 100) may be used with embodiments of the present invention to determine angle information through interferometry.

In some embodiments, the sonar signal processor is configured to ignore the detected heading that corresponds to the captured sonar return data when generating the 2D forward looking sonar image data. In this regard, the resulting 2D forward looking image is displayed irrespective of the heading of the transducer assembly, leaving interpretation for the user as to the direction and orientation of the image of the underwater environment shown in the display.

Figure 10:
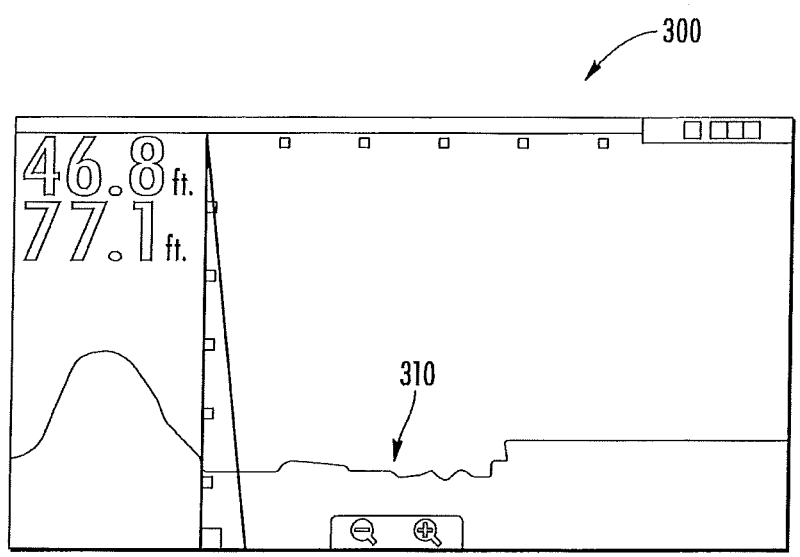
FIG. 10 shows an example 2D forward looking sonar image of an underwater environment, in accordance with some example embodiments described herein.
Figure 11:
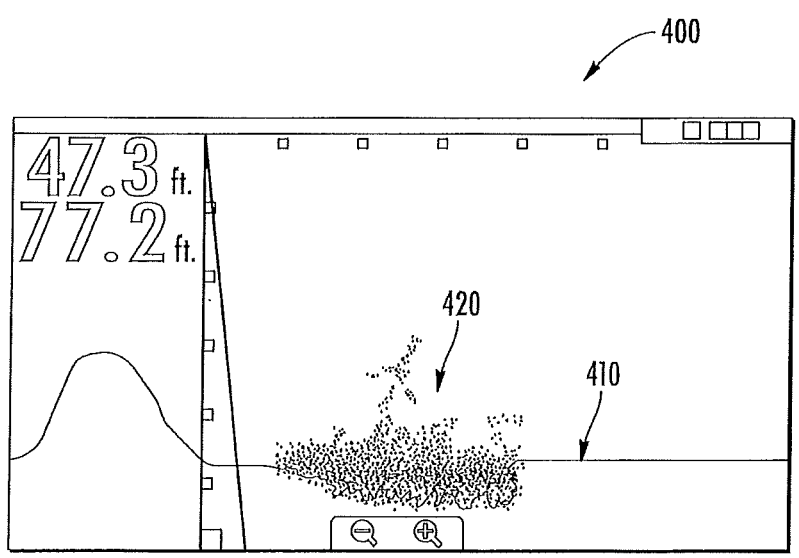
FIG. 11 shows another example 2D forward looking sonar image of the underwater environment, in accordance with some example embodiments described herein.

FIGS. 10 and 11 illustrate forward looking displays 300 and 400 derived from sonar return data in accordance with implementations of various techniques described herein. In particular, the 2D forward looking images 300 and 400 may represent depth contours of an underwater environment that is in front of the transducer assembly. The 2D forward looking images 300 and 400 may have respective depth lines 310 and 410 plotted on an x-y graph, where the depth lines correspond to the depth contours of the underwater environment in front of the transducer assembly. A vertical axis of the x-y graph may be used to display a scale of depths that correspond to the depth lines. The horizontal axis may be used to display a range of distance from the transducer assembly. A position of the watercraft on the 2D forward looking image may be represented by where the vertical axis meets the horizontal axis.

In one implementation, as the watercraft traverses through the body of water, the sonar signal processor may analyze the sonar data in real-time to produce the 2D forward looking image that corresponds to the real-time marine environment in front of the transducer assembly.

Further, the portions of the x-y graph underneath the depth lines may be filled in with color to provide a visual representation of the underwater environment. Such an implementation may provide an easier way for a user to interpret depth and forward range information.

The sonar signal processor may also perform auto-ranging to keep the 2D forward looking image in a range that is usable for the user. In particular, a range of the vertical axis may be determined based on the sonar data, such that the sonar signal processor may automatically detect a maximum depth in the data. A range of the horizontal axis may be determined based on a range of the vertical axis. For example, the range of the horizontal axis may be a multiple of the range of the vertical axis. Thus, as the range of the vertical axis increases in depth, the range of the horizontal axis may also increase.

In addition, as shown in FIG. 11, a point cloud representation 420 may also be included in the 2D forward looking image. In one implementation, the point cloud representation 420 may include information derived from raw sonar data regarding debris, fish, and/or the like that may be positioned in the underwater environment in front of the transducer assembly. In another implementation, the sonar signal processor may not include the point cloud representation 420 in the 2D forward looking image unless prompted by a user.

The 2D forward looking images may be developed using real-time marine electronics data (e.g., real time sonar data), as well as historical marine electronics data (e.g., historical sonar data and/or bathymetric charts). In another implementation, the 2D forward looking image may be selected as an option by the user from another representation being visualized. For example, the sonar signal processor may display a navigational chart having a heading line extension to a user, where the line extension may be used to indicate a future location of the watercraft if the watercraft maintains the current course. The sonar signal processor may provide an option on the navigational chart that, when selected by the user, will change the display to visualize the 2D forward looking image.

Example 3D Imaging

In some embodiments, the sonar signal processor is configured to generate 3D sonar image data corresponding to a 3D image of the underwater environment.

The sonar returns used to generate the corresponding 3D sonar image data may be received with at least and first transducer element and a second transducer element. The sonar returns may define a range. As detailed above, interferometry between the corresponding first sonar returns from the first transducer element and second sonar returns from the second transducer element is used to define an angle associated with each sonar return. In this regard, 2D (range and angle) sonar return data is generated.

With reference to FIG. 4A, the corresponding beam pattern 140 for receipt of the sonar returns may define a small beamwidth (e.g., 15°) in the horizontal direction. In this way, a relatively thin slice of sonar data of the underwater environment is captured. Each sonar return of the raw sonar data may be defined by, at least, a distance and an angle (e.g., 2D), which may be processed (e.g., by the sonar signal processor) to generate 2D sonar data. Further, even though there may be some space within the narrow width of the fan-shaped beam, the 2D sonar returns can be defined to ignore that width and, thus, be assumed to fall within the slice.

In some embodiments, different sets of 2D sonar return data (corresponding to a set of sonar pulses) may build up over time, generating a plurality of sets of slices of 2D sonar data. As detailed above, the sonar transducer assembly may comprise a heading sensor configured to detect the heading of the transducer elements. The detected heading may be associated with sonar returns captured by the transducer elements. Further, the detected heading may be transmitted to the sonar signal processor for aiding in arranging of the sonar images corresponding to each set of captured sonar returns. For example, each set (or slice) of 2D sonar return data may define a corresponding heading. The heading can be used to define the third dimension for creation of the 3D image (wherein the other two dimensions are range and angle of the sonar return).

In some embodiments, the sonar return data from the 2D slice and corresponding heading are saved in memory for processing to form the 3D sonar image data, which may be displayed as a 3D image. In some embodiments, 3D image data representing a 3D image may be stored in a buffer prior to or in conjunction with display on the screen.

In some embodiments, the sonar signal processor may be configured to process a plurality of sets of 2D sonar return data to generate a 3D representation of at least a portion of the underwater environment. In this regard, the plurality of sets of 2D sonar data (built up over time) may be processed together and used to generate the 3D image data. For example, the 3D image data may be produced by combining the points of interferometric return data from each set of 2D sonar data to create a 3D point cloud of individual data points. The 3D point cloud may then be processed (e.g., using the sonar signal processor) to generate a mesh based on the point cloud.

In some embodiments, 2D sonar data may be processed with one or more adjacent sets of 2D sonar data to produce an adjusted set of sonar data. The adjusted set of sonar data may include interpolated connections between the points of 2D sonar data and/or between adjacent sets of 2D sonar data to visualize the underwater environment. The adjusted set of sonar data may represent continuous contours or topographical meshes such that the 3D image data may be formed by connecting the adjusted sets of sonar data with connecting gridlines. For example, the sonar signal processor may be configured to reconstruct the bottom surface of the underwater environment based on the sonar returns that form the 3D point cloud. Further, the reconstructed bottom surface could be used to generate the 3D image data.

In some embodiments, the sonar signal processor may be configured to reconstruct objects within the underwater environment (e.g., fish, trees, submerged watercraft, etc.) and use the generated mesh to generate the 3D image data. Additionally or alternatively, only portions of the underwater environment may be reconstructed (e.g., just the bottom surface, or just the bottom surface and fish, etc.). The remaining raw sonar return data could be used to form the remainder of the 3D image data (e.g., using the raw sonar returns or presenting an icon (e.g., fish icon) in place of or over raw sonar returns that have been determined to correspond to an object represented by the icon). U.S. Patent Application Ser. No. 62/128,641, filed Mar. 5, 2015, entitled "Reconstruction of Underwater Features for 3D Imaging" provides additional detail regarding example systems and methods of reconstructing a 3D Image and is hereby incorporated by reference herein in its entirety.

In some embodiments, each of the sets of 2D sonar data may be used to form the 3D image data. In this regard, each set of 2D sonar data may be displayed on a display in the appropriate direction (using the detected heading) by adding the newest 2D vertical slice (e.g., a theoretical vertical slice) in the appropriate direction (e.g., similar to the description regarding FIGS. 5, 5A, and 6). In this regard, the raw sonar data made up of range and angle may be used to form the 3D image data.

In some embodiments, a combination of the above noted techniques can be used to form the 3D image data. For example, the bottom surface may be reconstructed and used to generate the 3D image data and the objects within the water column may be updated using the raw sonar data with positioning based on the detected heading.

In some embodiments, the 3D image may be displayed in a perspective view such that the contour of the floor of the body of water is visualized in three dimensions. Additionally, in some embodiments, the 3D image may also be turned with the movement of the boat such that the 3D image appears to turn with the watercraft and/or transducer assembly. In this regard, the display may be north up, boat up, transducer assembly up, or a user-defined direction up.

Figure 12:
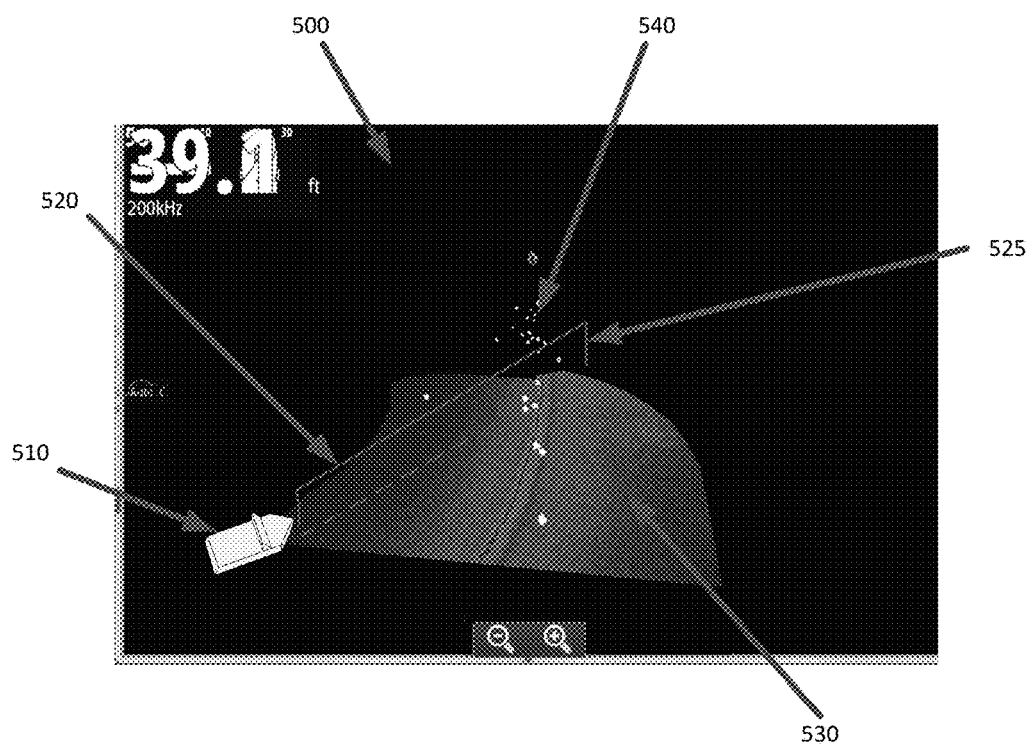
FIG. 12 shows an example 3D image of an underwater environment, in accordance with some example embodiments described herein.

FIG. 12 illustrates an example 3D image that may be displayed to a user. The 3D image shows the underwater environment 500 from a perspective of a viewer to the upper right of the watercraft 510. The bottom surface 530 of the underwater environment may be displayed and individual raw sonar returns 540 may also be displayed in the water column. A vertical plane 520 may be shown to indicate the current direction of the transducer assembly (though other icons or indicators may be used). As the transducer assembly rotates, the sonar returns 525 within the vertical plane 520 (in the water column, the bottom surface, or both) may be updated. Though the example 3D image shows just a small angle of the underwater environment, all 360° could be shown.

Example Method of Operation

Figure 13:
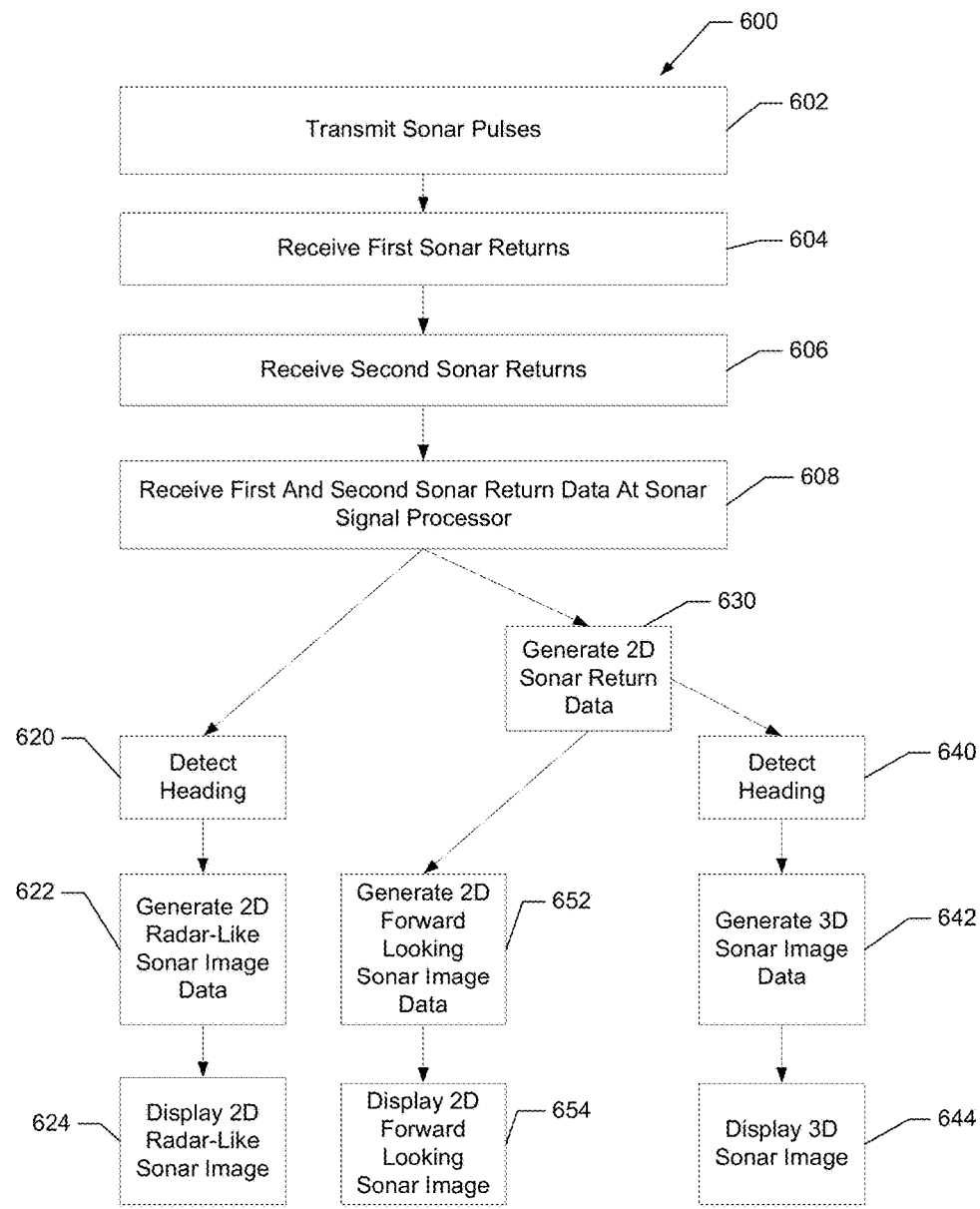
FIG. 13 illustrates an example method of operating an example sonar system, in accordance with example embodiments described herein.

FIG. 13 illustrates a flowchart according to an example method for operating a sonar system according to an example embodiment 600. Operations that are shown in dashed lines need to necessarily be performed for embodiments of the present invention.

Operation 602 may comprise transmitting one or more sonar pulses into the underwater environment. The processor 32, transceiver 34, transmitter circuitry 71, and or transducer elements 60, 62 may, for example, provide means for performing operation 602. Operation 604 may comprise receiving sonar returns from the sonar pulses with the first transducer element and converting the sonar returns into first sonar return data. Operation 606 may comprise receiving sonar returns from the sonar pulses with the second transducer element and converting the sonar returns into second sonar return data. Operation 608 may comprise transferring the first and second sonar return data to the processor. The transceiver 34 or receiver circuitry 72 may, for example, provide means for performing operation 608.

Operation 620 may comprise detecting a heading of the first and/or second sonar return data during capture. The processor 32 and/or heading sensor 69 may, for example, provide means for performing operation 620. Operation 622 may comprise generating 2D radar-like sonar image data based on at least one of the first sonar return data or the second sonar return data and the detected heading. The processor 32 may, for example, provide means for performing operation 622. Operation 624 may comprise displaying the 2D radar-like image of the underwater environment. The processor 32, user interface 39, or display 38 may, for example, provide means for performing operation 624.

Operation 630 may comprise generating 2D sonar return data that includes a range and an angle for each sonar return. The processor 32 may, for example, provide means for performing operation 630.

Operation 640 may comprise detecting a heading of the first and/or second sonar return data during capture. The processor 32 and/or heading sensor 69 may, for example, provide means for performing operation 640. Operation 642 may comprise generating 3D sonar image data based on the 2D sonar return data and the detected heading. The processor 32 may, for example, provide means for performing operation 642. Operation 644 may comprise displaying the 3D image of the underwater environment. The processor 32, user interface 39, or display 38 may, for example, provide means for performing operation 644.

Operation 652 may comprise generating 2D forward looking sonar image data based on the 2D sonar return data. The processor 32 may, for example, provide means for performing operation 652. Operation 654 may comprise displaying the 2D forward looking image of the underwater environment. The processor 32, user interface 39, or display 38 may, for example, provide means for performing operation 654.

Though the described embodiment of FIG. 13 details operating one example sonar system, some embodiments of the present invention contemplate methods for operating any example sonar system described herein.

Example System Hardware

In some embodiments, referring back to FIGS. 2 and 2A, the transducer assembly 36 and/or sonar module 44 may be positioned within a housing. The housing may include a recessed portion defining a containment volume for holding the transducer elements. To prevent cavitation or the production of bubbles due to uneven flow over the housing, the housing (and in particular the containment volume portion of the housing) may have a gradual, rounded or otherwise streamlined profile to permit laminar flow of water over the housing. In some examples, an insulated cable may provide a conduit for wiring (e.g., transmitter circuitry 71 or receiver circuitry 72) to couple each of the transducer elements to the sonar module 44. As detailed herein, any of a number of configurations of transducer elements and transducer arrays may be provided within the housing.

The shape of a transducer element may largely determine the type of beam that is formed when that transducer element transmits a sonar pulse (e.g., a circular transducer element emits a cone-shaped beam, a linear/rectangular transducer element emits a fan-shaped beam, etc.). In some embodiments, a transducer element may comprise one or more transducer elements positioned to form one transducer element. For example, a rectangular transducer element may comprise two or more rectangular transducer elements aligned with each other so as to be collinear. In some embodiments, three transducer elements aligned in a collinear fashion (e.g., end to end) may define one rectangular transducer element.

Likewise, transducer elements may comprise different types of materials that cause different sonar pulse properties upon transmission. For example, the type of material may determine the strength of the sonar pulse. Additionally, the type of material may affect the sonar returns received by the transducer element. As such, embodiments of the present invention are not meant to limit the shape or material of the transducer elements.

In some embodiments, each of the transducer elements (e.g., transducer elements 60, 62 shown in FIG. 3 and/or transducer elements 94, 96, 98, and 100) may be a rectangular transducer element. Thus, for example, each of the transducer elements may be substantially rectangular in shape and made from a piezoelectric material such as a piezoelectric ceramic material, as is well known in the art. In such a regard, the transducer elements may be configured to transmit and/or receive a fan-shaped beam (e.g., 15° by 90°, though any fan-shaped beam is contemplated).

As noted above, any of the transducer elements described herein may be configured to transmit and receive sonar pulses (e.g., transmit/receive transducer elements). While the transducer elements may be described herein as transmit/receive transducer elements, in some embodiments, the transducer elements may be configured as receive-only transducer elements, or in other cases, transmit-only transducer elements.

In some embodiments, each transducer element may be configured to operate at any frequency, including operation over an array of frequencies. Along these lines, it should be understood that many different operating ranges could be provided with corresponding different transducer element sizes and shapes (and corresponding different beamwidth characteristics). Moreover, in some cases, the sonar module 44 may include a variable frequency selector, to enable an operator to select a particular frequency of choice for the current operating conditions.

The active element in a given transducer may comprise at least one crystal. Wires are soldered to coatings so the crystal can be attached to a cable which transfers the electrical energy from the transmitter to the crystal. As an example, when the frequency of the electrical signal is the same as the mechanical resonant frequency of the crystal, the crystal moves, creating sound waves at that frequency. The shape of the crystal determines both its resonant frequency and shape and angle of the emanated sound beam. Frequencies used by sonar devices vary, but the most common ones range from 50 KHz to over 900 KHz depending on application. Some sonar systems vary the frequency within each sonar pulse using "chirp" technology. These frequencies are in the ultrasonic sound spectrum and are inaudible to humans.

It should be noted that although the widths of various beams are shown and described herein, the widths being referred to do not necessarily correspond to actual edges defining limits to where energy is placed in the water. As such, although beam patterns and projections of beam patterns are generally shown herein as having fixed and typically geometrically shaped and sharply defined boundaries, those boundaries merely correspond to the −3 dB (or half power) points for the transmitted beams. In other words, energy measured outside of the boundaries shown is less than half of the energy transmitted, but this sound energy is present nonetheless. Thus, some of the boundaries shown are merely theoretical half power point boundaries.

In an example embodiment, the sonar signal processor 32, the transceiver 34 and an Ethernet hub 42 or other network hub may form a sonar module 44. As such, for example, in some cases, the transducer assembly 36 may simply be placed into communication with the sonar module 44, which may itself be a mobile device that may be placed (but not necessarily mounted in a fixed arrangement) in the vessel to permit easy installation of one or more displays 38, each of which may be remotely located from each other and operable independent of each other. In this regard, for example, the Ethernet hub 42 may include one or more corresponding interface ports for placing the network 40 in communication with each display 38 in a plug-n-play manner. As such, for example, the Ethernet hub 42 may not only include the hardware needed to enable the displays 38 to be plugged into communication with the network 40 via the Ethernet hub 42, but the Ethernet hub 42 may also include or otherwise be in communication with software modules for providing information to enable the sonar module 44 to communicate with one or more different instances of the display 38 that may or may not be the same model or type of display and that may display the same or different information. In other words, the sonar module 44 may store configuration settings defining a predefined set of display types with which the sonar module is compatible so that if any of the predefined set of display types are placed into communication with the sonar module 44, the sonar module 44 may operate in a plug-n-play manner with the corresponding display types. Accordingly, the sonar module 44 may include a memory storing device driver accessible to the Ethernet hub 42 to enable the Ethernet hub 42 to properly work with displays for which the sonar module 44 is compatible. The sonar module 44 may also be enabled to be upgraded with additional device drivers or transceivers to enable expansion of the numbers and types of devices with which the sonar module 44 may be compatible. In some cases, the user may select a display type to check whether a display type is supported and, if the display type is not supported, contact a network entity to request software and/or drivers for enabling support of the corresponding display type.

The sonar signal processor 32 may be any means such as a device or circuitry operating in accordance with software or otherwise embodied in hardware or a combination of hardware and software (e.g., a processor operating under software control or the processor embodied as an application specific integrated circuit (ASIC) or field programmable gate array (FPGA) specifically configured to perform the operations described herein, or a combination thereof) thereby configuring the device or circuitry to perform the corresponding functions of the sonar signal processor 32 as described herein. In this regard, the sonar signal processor 32 may be configured to analyze electrical signals communicated thereto by the transceiver 34 to provide sonar data indicative of the size, location, shape, etc. of objects detected by the sonar system. For example, the sonar signal processor 32 may be configured to receive sonar return data and process the sonar return data to generate sonar image data for display to a user (e.g., on display 38).

In some cases, the sonar signal processor 32 may include a processor, a processing element, a coprocessor, a controller or various other processing means or devices including integrated circuits such as, for example, an ASIC, FPGA or hardware accelerator, that is configured to execute various programmed operations or instructions stored in a memory device. The sonar signal processor 32 may further or alternatively embody multiple compatible additional hardware or hardware and software items to implement signal processing or enhancement features to improve the display characteristics or data or images, collect or process additional data, such as time, temperature, GPS information, waypoint designations, or others, or may filter extraneous data to better analyze the collected data. It may further implement notices and alarms, such as those determined or adjusted by a user, to reflect depth, presence of fish, proximity of other watercraft, etc. Still further, the processor, in combination with a storage module, may store incoming transducer data or screen images for future playback or transfer, or alter images with additional processing to implement zoom or lateral movement, or to correlate data, such as fish or bottom features to a GPS position or temperature. In an exemplary embodiment, the sonar signal processor 32 may execute commercially available software for controlling the transceiver 34 and/or transducer assembly 36 and for processing data received therefrom.

The transceiver 34 may be any means such as a device or circuitry operating in accordance with software or otherwise embodied in hardware or a combination of hardware and software (e.g., a processor operating under software control or the processor embodied as an ASIC or FPGA specifically configured to perform the operations described herein, or a combination thereof) thereby configuring the device or circuitry to perform the corresponding functions of the transceiver 34 as described herein. In this regard, for example, the transceiver 34 may include (or be in communication with) circuitry (e.g., transmitter circuitry 71 shown in FIG. 2) for providing one or more transmission electrical signals to the transducer assembly 36 for conversion to sound pressure signals based on the provided electrical signals to be transmitted as a sonar pulse. The transceiver 34 may also include (or be in communication with) circuitry (e.g., receiver circuitry 72) for receiving one or more electrical signals produced by the transducer assembly 36 responsive to sound pressure signals received at the transducer assembly 36 based on echo or other return signals received in response to the transmission of a sonar pulse. The transceiver 34 may be in communication with the sonar signal processor 32 to both receive instructions regarding the transmission of sonar signals and to provide information on sonar returns to the sonar signal processor 32 for analysis and ultimately for driving one or more of the displays 38 based on the sonar returns. In some embodiments, the transmitter circuitry 71 and/or receiver circuitry 72 may be positioned within the transceiver 34 or sonar module 44. In other embodiments the transmitter circuitry 71 and/or receiver circuitry 72 may be positioned within the transducer assembly 36. Likewise, in some embodiments, the transmitter circuitry 71 and/or receiver circuitry 72 may be positioned separate from the transducer assembly 36 and transceiver 34/sonar module 44.

Many modifications and other embodiments of the inventions set forth herein will come to mind to one skilled in the art to which these embodiments pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A sonar system for imaging an underwater environment relative to a watercraft, the sonar system comprising:
  a housing;
  a transducer array positioned within the housing, wherein the transducer array comprises:
    a first transducer element configured to transmit one or more sonar pulses into the underwater environment, wherein the first transducer element is further configured to receive first sonar returns from the sonar pulses and convert sound energy from the first sonar returns into first sonar return data; and
    a second transducer element configured to receive second sonar returns from the sonar pulses and convert sound energy from the second sonar returns into second sonar return data,
    wherein the first transducer element is positioned within the housing at a predetermined distance from the second transducer element, wherein the first transducer element and the second transducer element are vertically stacked within the housing and each define an emitting surface that is aimed at approximately a same angle with respect to the surface of the body of water, wherein the first transducer element and the second transducer element each define a rectangular shape and are configured to transmit and/or receive a fan-shaped sonar beam, wherein the fan-shaped sonar beam has a beamwidth of 15° in a horizontal direction and 90° in a vertical direction;
  wherein the housing is mountable so as to enable rotation of the transducer array with respect to the watercraft;
  a heading sensor configured to detect a heading of the transducer array; and
  a sonar signal processor configured to:
    receive the first sonar return data and the second sonar return data;
    generate a set of 2D sonar return data based on the first sonar return data and the second sonar return data by processing the first sonar return data and the second sonar return data to determine a distance value and an angle associated with each sonar return in the set of 2D sonar return data, wherein the angle associated with each sonar return is based on the predetermined distance between the first transducer element and the second transducer element, wherein the angle is associated with a vertical angle between a theoretical line corresponding to a surface of a body of water and a theoretical line extending from the transducer array to the sonar return, wherein the distance value associated with each sonar return corresponds to a distance between a position of the sonar return and the transducer array;

determine, based on the detected heading of the transducer array, a heading associated with the set of 2D sonar return data, wherein the set of 2D sonar return data is associated with the detected heading when the sonar returns associated with the set of 2D sonar return data are captured; and store, in memory, the generated set of 2D sonar return data in an associated manner with the determined heading.

2. The sonar system according to claim 1, wherein the housing is mountable to at least one of a trolling motor or a steerable device.

3. The sonar system accordingly to claim 1 further comprising a third transducer element configured to receive third sonar returns from the sonar pulses and convert sound energy from the third sonar returns into third sonar return data, and wherein the sonar signal processor is configured to:
receive the third sonar return data; and
generate the set of 2D sonar return data further based on the third sonar return data by using interferometry to process the first sonar return data, the second sonar return data, and the third sonar return data to determine the angle associated with each sonar return in the set of 2D sonar return data.

4. The sonar system according to claim 1, wherein the sonar signal processor is configured to generate, based on the set of 2D sonar return data, a 2D forward looking sonar image associated with the underwater environment, wherein the 2D forward looking image represents, at least, depth contours of a portion of the underwater environment in front of the transducer array.

5. The sonar system according to claim 1, wherein the sonar signal processor is configured to generate, based on the set of 2D sonar return data and the detected heading, 3D sonar image data associated with a 3D image of the underwater environment.

6. The sonar system according to claim 5, wherein the sonar signal processor is configured to generate the 3D image data by positioning at least a portion of the set of 2D sonar return data as a theoretical vertical 2D slice at an angle with respect to a point in the 3D image corresponding to a position of the transducer array, wherein the angle is determined based on the detected heading, and wherein the 3D image is formed into a horizontal pie-shaped region that is built-up from multiple vertical 2D slices emanating from the point in the 3D image corresponding to the position of the transducer array.

7. The sonar system according to claim 5, wherein the sonar signal processor is configured to generate the 3D image data by processing at least a portion of the set of 2D sonar return data with at least a portion of a second set of 2D sonar return data to generate a 3D representation of at least a portion of the underwater environment.

8. The sonar system according to claim 1, wherein the sonar signal processor is configured to generate, based on the at least one of the first sonar return data or the second sonar return data and the detected heading, 2D radar-like sonar image data associated with a 2D radar-like image of the underwater environment.

9. The sonar system according to claim 1, wherein the first and second transducer elements are each configured to receive respective first and second sonar returns from the sonar pulses while the first and second transducer elements are rotated at variable speeds.

10. The sonar system according to claim 1, wherein the first and second transducer elements are each configured to receive respective first and second sonar returns from the sonar pulses while the first and second transducer elements are rotated at a user-defined speed.

11. The sonar system according to claim 1, wherein the sonar signal processor is configured to generate each of at least:
2D forward looking sonar image data associated with a 2D forward looking image of the underwater environment based on the set of 2D sonar return data, wherein the 2D forward looking image represents, at least, depth contours of a portion of the underwater environment in front of the transducer array;
2D radar-like sonar image data associated with a 2D radar-like image of the underwater environment based on the at least one of the first sonar return data or the second sonar return data and the detected heading; and
3D sonar image data associated with a 3D image of the underwater environment based on the set of 2D sonar return data and the detected heading.

12. The sonar system according to claim 11 further comprising a display configured to display at least one of the 2D forward looking image, the 2D radar-like image, or the 3D image.

13. The sonar system according to claim 12, wherein the display is configured to display, on a single screen, at least two of the 2D forward looking image, the 2D radar-like image, or the 3D image.

14. The sonar system according to claim 13, wherein the display is configured to display chart information on a single screen with the at least one of the 2D forward looking image, the 2D radar-like image, or the 3D image.

15. A sonar transducer assembly for imaging an underwater environment relative to a watercraft, the sonar transducer assembly comprising:
a housing;
a transducer array positioned within the housing, wherein the transducer array comprises:
a first transducer element configured to transmit one or more sonar pulses into the underwater environment, wherein the first transducer element is further configured to receive first sonar returns from the sonar pulses and convert sound energy from the first sonar returns into first sonar return data; and
a second transducer element configured to receive second sonar returns from the sonar pulses and convert sound energy from the second sonar returns into second sonar return data,
wherein the first transducer element is positioned within the housing at a predetermined distance from the second transducer element, wherein the first transducer element and the second transducer element are vertically stacked within the housing and each define an emitting surface that is aimed at approximately a same angle with respect to the surface of the body of water, wherein the first transducer element and the second transducer element each define a rectangular shape and are configured to transmit and/or receive a fan-shaped sonar beam, wherein the fan-shaped sonar beam corresponding to the sonar pulse of the first transducer element has a beamwidth of 15° in a horizontal direction and 90° in a vertical direction;

wherein the housing is mountable so as to enable rotation of the transducer array with respect to the watercraft;
a heading sensor configured to detect a heading of the transducer array; and
a sonar signal processor configured to:
receive the first sonar return data and the second sonar return data;
generate a set of 2D sonar return data based on the first sonar return data and the second sonar return data by processing the first sonar return data and the second sonar return data to determine a distance value and an angle associated with each sonar return in the set of 2D sonar return data, wherein the angle associated with each sonar return is based on the predetermined distance between the first transducer element and the second transducer element, wherein the angle is associated with a vertical angle between a theoretical line corresponding to a surface of a body of water and a theoretical line extending from the transducer array to the sonar return, wherein the distance value associated with each sonar return corresponds to a distance between a position of the sonar return and the transducer array;
determine, based on the detected heading of the transducer array, a heading associated with the set of 2D sonar return data, wherein the set of 2D sonar return data is associated with the detected heading when the sonar returns associated with the set of 2D sonar return data are captured; and
store, in memory, the generated set of 2D sonar return data in an associated manner with the determined heading.

16. The sonar transducer assembly according to claim 15, wherein the housing is mountable to at least one of a trolling motor or a steerable device.

17. The sonar transducer assembly accordingly to claim 15 further comprising a third transducer element configured to receive third sonar returns from the sonar pulses and convert sound energy from the third sonar returns into third sonar return data, and wherein the sonar signal processor is configured to:
receive the third sonar return data; and
generate the set of 2D sonar return data further based on the third sonar return data by using interferometry to process the first sonar return data, the second sonar return data, and the third sonar return data to determine the angle associated with each sonar return in the set of 2D sonar return data.

18. The sonar transducer assembly according to claim 15, wherein the sonar signal processor is configured to generate, based on the set of 2D sonar return data, a 2D forward looking sonar image associated with the underwater environment, wherein the 2D forward looking image represents, at least, depth contours of a portion of the underwater environment in front of the transducer array.

19. The sonar transducer assembly according to claim 15, wherein the sonar signal processor is configured to generate, based on the set of 2D sonar return data and the detected heading, 3D sonar image data associated with a 3D image of the underwater environment.

20. The sonar transducer assembly according to claim 15, wherein the first and second transducer elements are each configured to receive respective first and second sonar returns from the sonar pulses while the first and second transducer elements are rotated at variable speeds.

21. The sonar transducer assembly according to claim 15, wherein the first and second transducer elements are each configured to receive respective first and second sonar returns from the sonar pulses while the first and second transducer elements are rotated at a user-defined speed.

22. A method for imaging an underwater environment relative to a watercraft, the method comprising:
transmitting one or more sonar pulses into the underwater environment from a first transducer element of a transducer array, wherein the transducer array is positioned within a housing, wherein the housing is mountable so as to enable rotation of the transducer array with respect to the watercraft;
receiving first sonar returns from the sonar pulses with the first transducer element, wherein the first transducer element is configured to convert sound energy from the first sonar returns into first sonar return data;
receiving second sonar returns from the sonar pulses with a second transducer element of the transducer array, wherein the second transducer element is configured to convert sound energy from the second sonar returns into second sonar return data, wherein the first transducer element is positioned within the housing at a predetermined distance from the second transducer element, wherein the first transducer element and the second transducer element are vertically stacked within the housing and each define an emitting surface that is aimed at approximately a same angle with respect to the surface of the body of water, wherein the first transducer element and the second transducer element each define a rectangular shape and are configured to transmit and/or receive a fan-shaped sonar beam, wherein the fan-shaped sonar beam corresponding to the sonar pulse of the first transducer element has a beamwidth of 15° in a horizontal direction and 90° in a vertical direction;
receiving the first sonar return data and the second sonar return data with a sonar signal processor;
generating, by the sonar signal processor, a set of 2D sonar return data based on the first sonar return data and the second sonar return data by processing the first sonar return data and the second sonar return to determine a distance value and an angle associated with each sonar return in the set of 2D sonar return data, wherein the angle associated with each sonar return is based on the predetermined distance between the first transducer element and the second transducer element, wherein the angle is associated with a vertical angle between a theoretical line corresponding to a surface of a body of water and a theoretical line extending from the transducer array to the sonar return, wherein the distance value associated with each sonar return corresponds to a distance between a position of the sonar return and the transducer array;
determining, from a heading sensor, a heading of the transducer array associated with the set of 2D sonar return data, wherein the set of 2D sonar return data is associated with the detected heading when the sonar returns associated with the set of 2D sonar return data are captured; and
storing, in memory, the generated set of 2D sonar return data in an associated manner with the determined heading.

23. The method according to claim 22, wherein the housing is mountable to at least one of a trolling motor or a steerable device.

24. The method according to claim 22 further comprising generating, by the sonar signal processor and based on the set of 2D sonar return data, a 2D forward looking sonar image associated with the underwater environment, wherein the 2D forward looking image represents, at least, depth contours of a portion of the underwater environment in front of the transducer array.

25. The method according to claim 24 further comprising displaying, by a display, the 2D forward looking image.

26. The method according to claim 22 further comprising generating, by the sonar signal processor and based on the set of 2D sonar return data and the detected heading, 3D sonar image data associated with a 3D image of the underwater environment.

27. The method according to claim 26, wherein generating the 3D image data comprises generating the 3D image data by positioning at least a portion of the set of 2D sonar return data as a theoretical vertical 2D slice at an angle with respect to a point in the 3D image corresponding to a position of the transducer array, wherein the angle is determined based on the detected heading, and wherein the 3D image is formed into a horizontal pie-shaped region that is built-up from multiple vertical 2D slices emanating from the point in the 3D image corresponding to the position of the transducer array.

28. The method according to claim 26, wherein generating the 3D image data comprises generating the 3D image data by processing at least a portion of the set of 2D sonar return data with at least a portion of a second set of 2D sonar return data to generate a 3D representation of at least a portion of the underwater environment.

29. The method according to claim 26 further comprising displaying, by a display, the 3D image.

30. The method according to claim 22 further comprising generating, by the sonar signal processor and based on the at least one of the first sonar return data or the second sonar return data and the detected heading, 2D radar-like sonar image data associated with a 2D radar-like image of the underwater environment.

* * * * *